(12) United States Patent
Chiu et al.

(10) Patent No.: US 12,451,175 B2
(45) Date of Patent: Oct. 21, 2025

(54) MEMORY DEVICE AND FORMATION METHOD THEREOF

(71) Applicants: TAIWAN SEMICONDUCTOR MANUFACTURING COMPANY, LTD., Hsinchu (TW); NATIONAL TAIWAN UNIVERSITY, Taipei (TW)

(72) Inventors: Jih-Chao Chiu, New Taipei (TW); Ya-Jui Tsou, Taichung (TW); Wei-Jen Chen, Tainan (TW); Chee-Wee Liu, Taipei (TW); Shao-Yu Lin, Taichung (TW); Chih-Lin Wang, Hsinchu County (TW)

(73) Assignees: TAIWAN SEMICONDUCTOR MANUFACTURING COMPANY, LTD .., Hsinchu (TW); NATIONAL TAIWAN UNIVERSITY, Taipei (TW)

( * ) Notice: Subject to any disclaimer, the term of this patent is extended or adjusted under 35 U.S.C. 154(b) by 557 days.

(21) Appl. No.: 17/736,652

(22) Filed: May 4, 2022

(65) Prior Publication Data
US 2023/0027792 A1    Jan. 26, 2023

Related U.S. Application Data

(60) Provisional application No. 63/225,189, filed on Jul. 23, 2021.

(51) Int. Cl.
*G11C 11/16* (2006.01)
*H10B 61/00* (2023.01)
(Continued)

(52) U.S. Cl.
CPC ........ *G11C 11/161* (2013.01); *G11C 11/1655* (2013.01); *G11C 11/1659* (2013.01);
(Continued)

(58) Field of Classification Search
CPC ............. G11C 11/161; G11C 11/1655; G11C 11/1659; G11C 11/1673; G11C 11/1675;
(Continued)

(56) References Cited

U.S. PATENT DOCUMENTS 9,793,391 B2 * 10/2017 Haeberlen ........... H01L 29/7805
10,283,701 B1 * 5/2019 Ikhtiar .................. G11C 11/161
(Continued)

OTHER PUBLICATIONS

Kim et al., "Multilevel Spin-Orbit Torque MRAMs", IEEE Transactions on Electron Devices, vol. 62, No. 2, Feb. 2015, pp. 561-568.

*Primary Examiner* — Caleb E Henry
(74) *Attorney, Agent, or Firm* — Birch, Stewart, Kolasch & Birch, LLP

(57) ABSTRACT

A memory device includes a spin-orbit-transfer (SOT) bottom electrode, an SOT ferromagnetic free layer, a first tunnel barrier layer, a spin-transfer-torque (STT) ferromagnetic free layer, a second tunnel barrier layer and a reference layer. The SOT ferromagnetic free layer is over the SOT bottom electrode. The SOT ferromagnetic free layer has a magnetic orientation switchable by the SOT bottom electrode using a spin Hall effect or Rashba effect. The first tunnel barrier layer is over the SOT ferromagnetic free layer. The STT ferromagnetic free layer is over the first tunnel barrier layer and has a magnetic orientation switchable using an STT effect. The second tunnel barrier layer is over the STT ferromagnetic free layer. The second tunnel barrier layer has a thickness different from a thickness of the first tunnel barrier layer. The reference layer is over the second tunnel barrier layer and has a fixed magnetic orientation.

20 Claims, 37 Drawing Sheets

(51) Int. Cl.
  *H10N 50/10* (2023.01)
  *H10N 50/85* (2023.01)
  *H10N 52/00* (2023.01)
  *H10N 52/01* (2023.01)
  *H10N 52/80* (2023.01)

(52) U.S. Cl.
  CPC ...... *G11C 11/1673* (2013.01); *G11C 11/1675* (2013.01); *H10B 61/22* (2023.02); *H10N 50/10* (2023.02); *H10N 50/85* (2023.02); *H10N 52/01* (2023.02); *H10N 52/101* (2023.02); *H10N 52/80* (2023.02)

(58) Field of Classification Search
  CPC .... G11C 11/5607; H10B 61/22; H10N 50/10; H10N 50/85; H10N 52/01; H10N 52/101; H10N 52/80
  See application file for complete search history.

(56) References Cited

U.S. PATENT DOCUMENTS

| | | | |
|---|---|---|---|
| 10,483,457 B1* | 11/2019 | Lee | H10N 50/10 |
| 10,516,096 B2 | 12/2019 | Tahmasebi et al. | |
| 10,573,688 B2 | 2/2020 | Swerts | |
| 10,636,962 B2* | 4/2020 | Park | H01F 10/3254 |
| 10,770,213 B2 | 9/2020 | Swerts et al. | |
| 2004/0150038 A1* | 8/2004 | Hshieh | H01L 21/28185 257/330 |
| 2010/0264488 A1* | 10/2010 | Hsieh | H01L 29/66727 257/334 |
| 2011/0233700 A1* | 9/2011 | Hayakawa | H01F 10/16 257/E29.323 |
| 2017/0117027 A1* | 4/2017 | Braganca | H10B 61/10 |
| 2017/0125078 A1* | 5/2017 | Mihajlovic | G11C 11/161 |
| 2017/0365777 A1* | 12/2017 | Mihajlovic | H10N 50/10 |
| 2018/0033956 A1* | 2/2018 | Hyunsoo | H10N 50/85 |
| 2018/0061467 A1* | 3/2018 | Kan | G11C 11/1659 |
| 2018/0151210 A1* | 5/2018 | Li | G11C 11/161 |
| 2019/0051815 A1* | 2/2019 | Kakinuma | H10N 50/10 |
| 2019/0088713 A1* | 3/2019 | Swerts | H01F 10/3295 |
| 2019/0244646 A1* | 8/2019 | Lee | H10N 50/80 |
| 2019/0252601 A1* | 8/2019 | Chatterjee | H10B 61/10 |
| 2019/0259808 A1* | 8/2019 | Jacob | H10N 50/80 |
| 2019/0259810 A1* | 8/2019 | Jacob | G11C 11/161 |
| 2019/0305042 A1* | 10/2019 | Chen | G11C 11/1673 |
| 2019/0326353 A1* | 10/2019 | O'Brien | H10N 70/826 |
| 2020/0006424 A1* | 1/2020 | Sato | H10B 61/22 |
| 2020/0035909 A1* | 1/2020 | Sun | H10N 52/101 |
| 2020/0043538 A1* | 2/2020 | Mihajlovic | G11C 11/1655 |
| 2020/0105946 A1* | 4/2020 | Lanois | H01L 29/8613 |
| 2020/0136018 A1* | 4/2020 | Ying | G11C 11/1655 |
| 2020/0161541 A1* | 5/2020 | Tseng | H10B 61/00 |
| 2020/0168664 A1* | 5/2020 | Noh | H10N 52/80 |
| 2020/0203599 A1* | 6/2020 | Chia | H10B 61/22 |
| 2020/0312394 A1* | 10/2020 | Le | G11C 11/161 |
| 2020/0395530 A1* | 12/2020 | Tsou | H10N 50/10 |
| 2020/0403152 A1* | 12/2020 | Xue | G11C 11/161 |
| 2021/0125650 A1* | 4/2021 | Jung | H10N 50/85 |
| 2021/0134339 A1* | 5/2021 | Song | G11C 11/18 |
| 2021/0135090 A1 | 5/2021 | Sun | |
| 2021/0159402 A1* | 5/2021 | Ikhtiar | G11C 11/161 |
| 2021/0202827 A1* | 7/2021 | Song | H10N 50/01 |
| 2021/0327960 A1* | 10/2021 | Xiao | H10N 50/85 |
| 2021/0328134 A1* | 10/2021 | Guo | H10N 50/10 |
| 2022/0044718 A1* | 2/2022 | Guo | G11B 5/3909 |
| 2022/0115049 A1* | 4/2022 | Sonobe | G11C 11/161 |
| 2022/0165470 A1* | 5/2022 | Guo | H01F 41/302 |
| 2022/0199685 A1* | 6/2022 | Wan | H10N 50/80 |

* cited by examiner

|     | Read | Write | | | |
| --- | --- | --- | --- | --- | --- |
|     |      | FL1↑ | FL1↓ | FL2↑ | FL2↓ |
| WL1 | $V_{DD}$ | $V_{DD}$ | $V_{DD}$ | 0 | 0 |
| WL2 | 0 | 0 | 0 | $V_{DD}$ | $V_{DD}$ |
| BL  | $V_{READ}$ | $V_{DD}$ | 0 | 0 | $V_{DD}$ |
| SL  | 0 | 0 | $V_{DD}$ | $V_{DD}$ | 0 |

Fig. 7

|        | Read        | Write    |          |          |          |
|--------|-------------|----------|----------|----------|----------|
|        |             | FL1 ↑    | FL1 ↓    | FL2 ↑    | FL2 ↓    |
| WL1    | $V_{DD}$    | 0        | $V_{DD}$ | $V_{DD}$ | $V_{DD}$ |
| WL2    | 0           | $V_{DD}$ | 0        | $V_{DD}$ | $V_{DD}$ |
| $BL_{SOT}$ | $V_{READ}$ | 0    | 0        | 0        | $V_{DD}$ |
| SL     | 0           | $V_{DD}$ | 0        | $V_{DD}$ | 0        |
| $BL_{STT}$ | 0       | 0        | $V_{DD}$ | 0        | 0        |

Fig. 9

|  | FL1 | FL2 |
|---|---|---|
| $M_S$ (emu/cm$^3$) | 800 ± 10 | 800 ± 10 |
| Damping α | 0.005 ± 0.0001 | 0.005 ± 0.0001 |
| $A_{ex}$ (pJ/m) | 20 ± 2 | 20 ± 2 |
| Thickness (nm) | 1 ± 0.1 | 1 ± 0.1 |
| $K_i$ (mJ/m$^2$) | 1 ± 0.1 | 1 ± 0.1 |
| Spin polarization | 0.65 ± 0.1 | 0.65 ± 0.1 |
| Write current | 50 ± 1 μA | 1.5 ± 1 mA |

Fig. 14

MEMORY DEVICE AND FORMATION METHOD THEREOF

PRIORITY CLAIM AND CROSS-REFERENCE

This application claims priority to U.S. Provisional Application Ser. No. 63/225,189, filed Jul. 23, 2021, which is herein incorporated by reference.

BACKGROUND

In integrated circuit (IC) devices, magnetoresistive random access memory (MRAM) is an emerging technology for next generation embedded memory devices. MRAM is a non-volatile memory where data is stored in magnetic storage elements. In simple configurations, each cell has two ferromagnetic plates, each of which can hold a magnetic field, separated by a thin insulating layer. MRAM has a simple cell structure and complementary metal oxide semiconductor (CMOS) logic compatible processes which result in a reduction of the manufacturing complexity and cost in comparison with other non-volatile memory structures.

BRIEF DESCRIPTION OF THE DRAWINGS

Aspects of the present disclosure are best understood from the following detailed description when read with the accompanying Figures. It is noted that, in accordance with the standard practice in the industry, various features are not drawn to scale. In fact, the dimensions of the various features may be arbitrarily increased or reduced for clarity of discussion.

FIG. 7 illustrates a table of various voltages served to operate the circuit of FIG. 6.

FIG. 9 illustrates a table of various voltages served to operate the circuit of FIG. 8.

FIG. 14 is a table listing example parameters of the STT ferromagnetic free layer and the SOT ferromagnetic free layer in some embodiments of the present disclosure.

DETAILED DESCRIPTION

Figure 1:
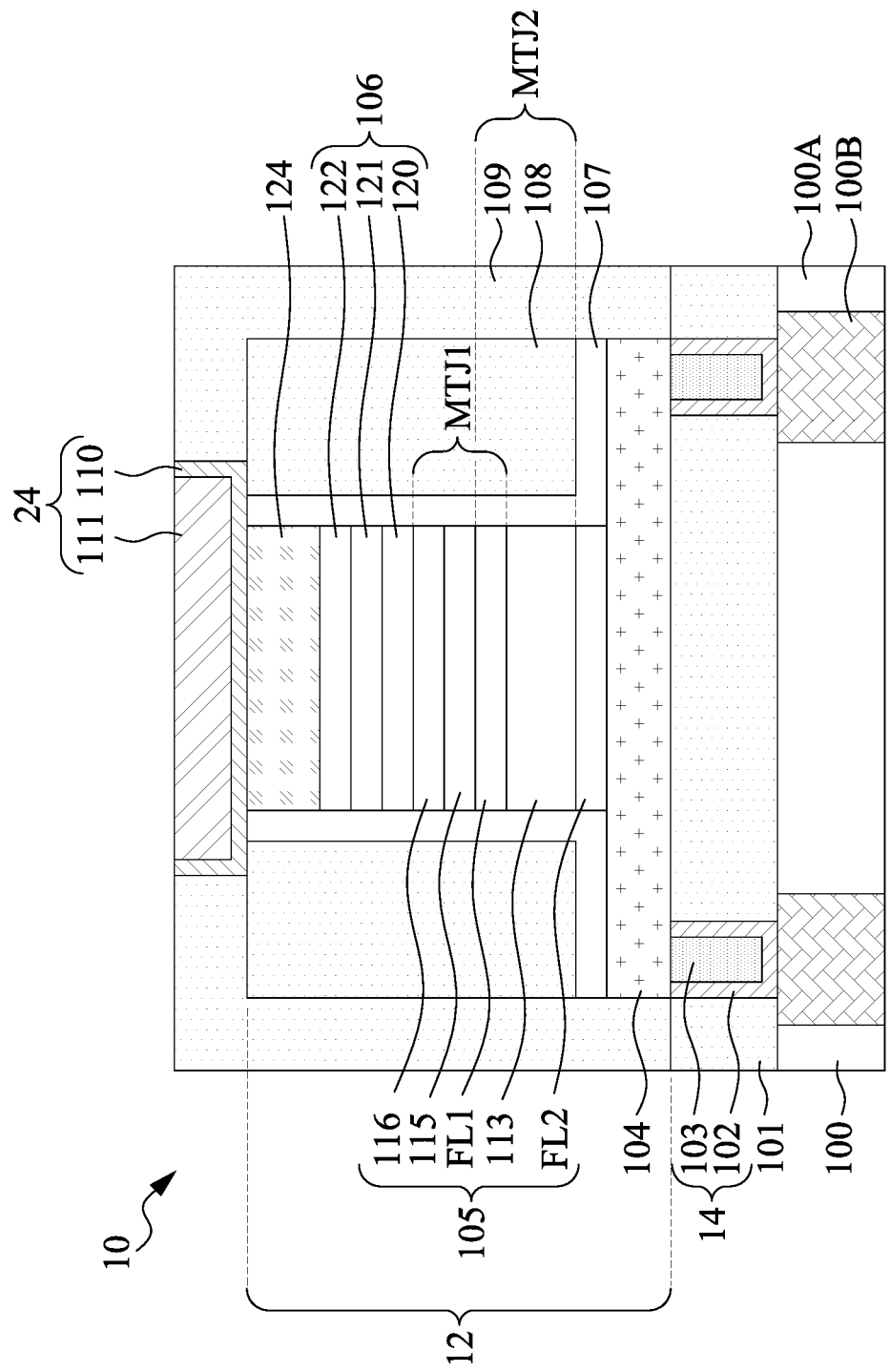
FIG. 1 is a schematic cross-sectional view of a memory device in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the Figures. The spatially relative terms are intended to encompass different orientations of the device in use or operation in addition to the orientation depicted in the Figures. The apparatus may be otherwise oriented (rotated 90 degrees or at other orientations) and the spatially relative descriptors used herein may likewise be interpreted accordingly.

Figure 2:
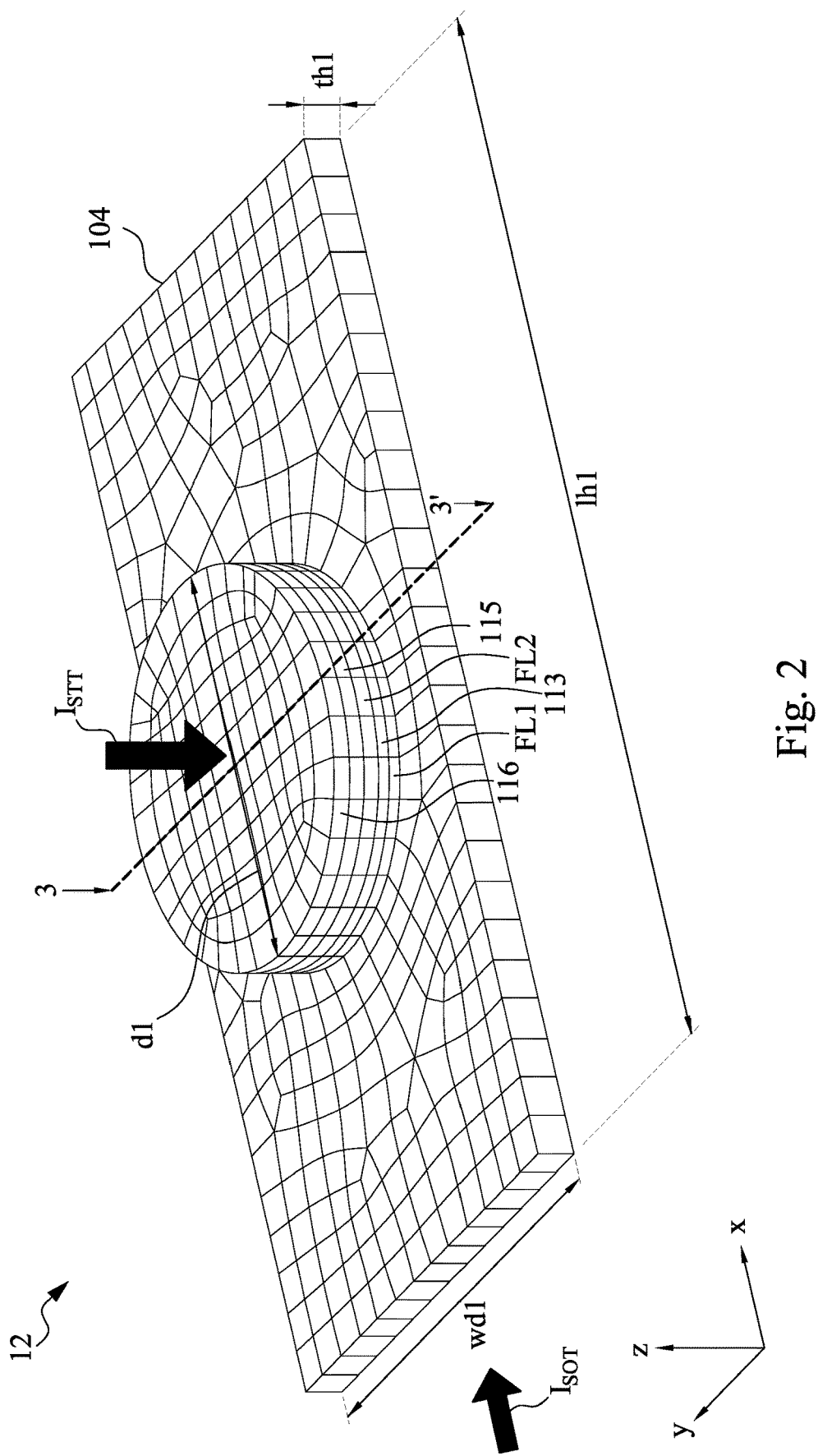
FIG. 2 is a schematic view illustrating micromagnetic simulation of a Spin-Orbit-Torque (SOT)-Spin-Transfer-Torque (STT) hybrid Magneto-resistive Random Access Memory (MRAM) cell in accordance with some embodiments.
Figure 3:
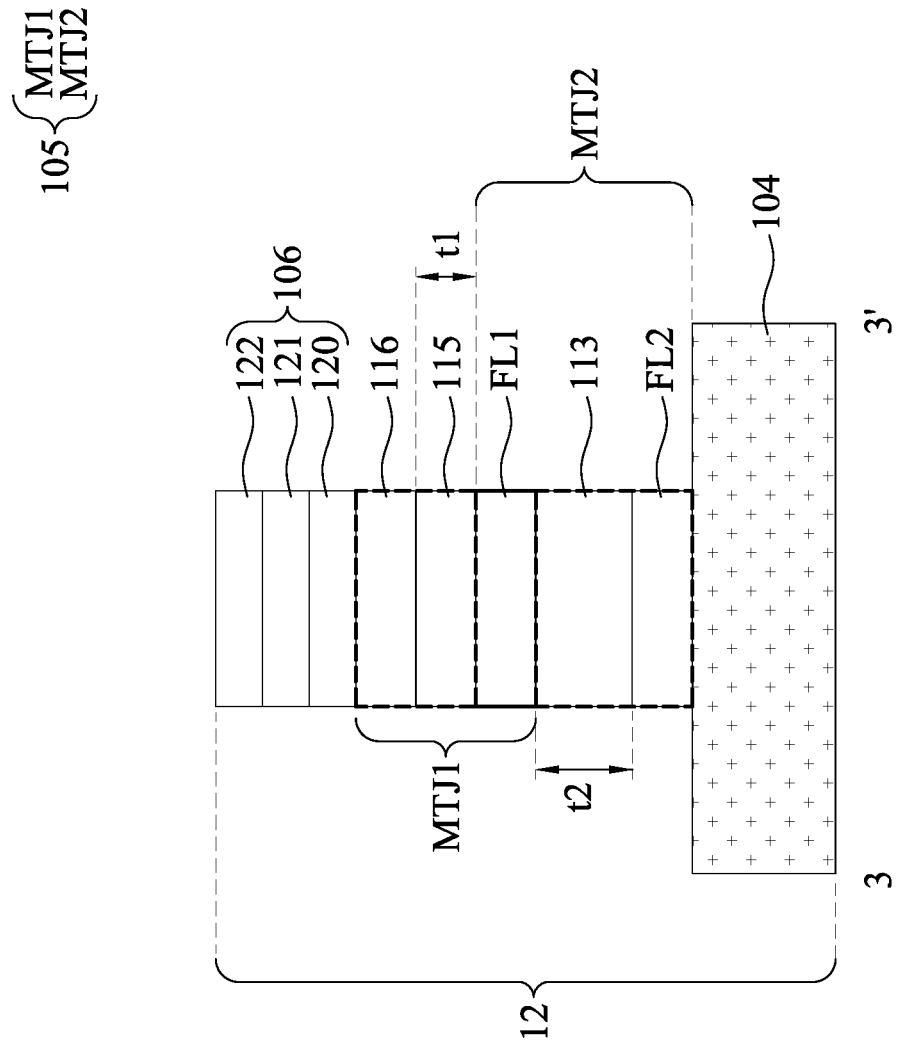
FIG. 3 is a cross-sectional view along line 3-3' in FIG. 2.

FIG. 1 is a schematic cross-sectional view of a memory device 10 in accordance with some embodiments. FIG. 2 is a schematic view illustrating micromagnetic simulation of a Spin-Orbit-Torque (SOT)-Spin-Transfer-Torque (STT) hybrid Magneto-resistive Random Access Memory (MRAM) cell 12 in accordance with some embodiments. FIG. 3 is a cross-sectional view along line 3-3' in FIG. 2. Reference is made to FIGS. 1-3. The memory device 10 includes a substrate 100 and a SOT-STT hybrid MRAM cell 12. According to some embodiments of this disclosure, the SOT-STT hybrid MRAM cell 12 is formed within a logic region of the substrate 100. The substrate 100 will go through a variety of cleaning, layering, patterning, etching and doping steps. The term "substrate" herein generally refers to a bulk substrate on which various layers and device elements are formed. In some embodiments, the bulk substrate includes, for example, silicon or a compound semiconductor, such as GaAs, InP, SiGe, or SiC. Examples of the layers include dielectric layers, doped layers, polysilicon layers or conductive layers. Examples of the device elements include transistors (e.g., planar FET, FinFET, nanosheet FET), resistors, and/or capacitors, which may be interconnected through an interconnect layer to additional integrated circuits.

In some embodiments, the substrate 100 has an interconnect structure having an inter-layer dielectric (ILD) layer or inter-metal dielectric layer (IMD) layer 100A with a metallization pattern 100B formed in the ILD layer 100A. The ILD layer 100A may be silicon oxide, fluorinated silica glass (FSG), carbon doped silicon oxide, tetra-ethyl-ortho-silicate (TEOS) formed oxide, phosphosilicate glass (PSG), borophosphosilicate glass (BPSG), Black Diamond® (Applied Materials of Santa Clara, Calif.), amorphous fluorinated carbon, low-k dielectric material, the like or combinations thereof. The metallization patterns 100B may be aluminum, aluminum alloy, copper, copper alloy, titanium, titanium nitride, tantalum, tantalum nitride, tungsten, the like, and/or combinations thereof. Formation of the metallization patterns 100B and the ILD layer 100A may be a dual-damascene process and/or a single-damascene process.

A dielectric layer 101 is on the substrate 100. Two bottom electrode vias (BEVA) 14 are formed within the dielectric layer 101 and include a diffusion barrier layer 102 and a filling metal 103 over the diffusion barrier layer 102. In some embodiments, the BEVAs 14 are electrically connected to one or more underlying electrical devices, such as one or more transistors, through the metallization patterns 100B. In some embodiments, the filling metal 103 is copper (Cu) or the like. In some embodiments, the diffusion barrier layer 102 is a titanium nitride (TiN) layer, a tantalum nitride (TaN) layer or a tantalum (Ta) layer, which can act as a suitable barrier to prevent metal diffusion. The diffusion barrier layer 102 may have a thickness in a range from 1 nm to 1 μm. The filling metal 103 may have a thickness in a range from 1 nm to 1 μm. In some embodiments, the dielectric layer 101 includes silicon oxide, fluorinated silica glass (FSG), carbon doped silicon oxide, tetra-ethyl-ortho-silicate (TEOS) formed oxide, phosphosilicate glass (PSG), borophosphosilicate glass (BPSG), amorphous fluorinated carbon, low-k dielectric material, the like or combinations thereof.

A Spin-Orbit-Torque (SOT) bottom electrode 104 is over the BEVAs 14 and over the dielectric layer 101. The SOT bottom electrode 104 can be a single-layered structure or a multi-layered structure. In some other embodiments, the SOT bottom electrode 104 includes a material different from the filling metal 103 of the BEVAs 14. In some embodiments, the SOT bottom electrode 104 is a heavy metal layer with strong spin-orbit interaction, including tantalum (Ta), tungsten (W), platinum (Pt), the like, and/or combinations thereof. The SOT bottom electrode 104 may have a length lh1 (along x axis) in a range from 10 nm to 1 μm (e.g., 80 nm), a width wd1 (along y axis) in a range from 10 nm to 1 μm (e.g., 40 nm) and a thickness th1 (along z axis) in a range from 0.1 nm to 100 nm (e.g., 3 nm). The SOT bottom electrode 104 is a spin orbit active layer that has a strong spin-orbit interaction and that can be used in switching the magnetic orientation of an SOT ferromagnetic free layer FL2. The SOT bottom electrode 104 is used in generating a spin-orbit magnetic field. More specifically, a current driven in a plane through the SOT bottom electrode 104 and the attendant spin-orbit interaction may result in the spin-orbit magnetic field. This spin orbit magnetic field is equivalent to the spin-orbit torque on magnetization in the SOT ferromagnetic free layer FL2. The torque and magnetic field are thus interchangeably referred to as spin-orbit field and spin-orbit torque. This reflects the fact that the spin-orbit interaction is the origin of the spin-orbit torque and spin-orbit field. Spin-orbit torque occurs for a current driven in a plane in the SOT bottom electrode 104 and a spin-orbit interaction. In contrast, spin transfer torque is due to a perpendicular-to-plane current flowing through the MTJ stack.

The SOT-STT hybrid MRAM cell 12 includes a memory stack 105, an overlying synthetic anti-ferromagnetic (SAF) layer 106 and a hard mask 124 on the SOT bottom electrode 104. For example, the memory stack 105 is a magnetic tunnel junction (MTJ) stack and includes, from bottom to top, a SOT ferromagnetic free layer FL2, a first tunnel barrier layer 113, an STT ferromagnetic free layer FL1, a second tunnel barrier layer 115 and a reference layer 116. The SAF layer 106 is configured to fix the magnetic orientation of the reference layer 116. The SAF layer 106 and the hard mask 124 have been omitted in FIG. 2 for the sake of clarity. The SAF layer 106 is also called "pinned layer." The hard mask 124 serves as the top electrode of the memory stack 105.

The SOT ferromagnetic free layer FL2, the first tunnel barrier layer 113 and the STT ferromagnetic free layer FL1 are collectively referred to as a SOT MTJ stack MTJ2 or a Spin-Orbit-Torque (SOT) Magnetic Tunnel Junction (MTJ) stack MTJ2 throughout the description. The STT ferromagnetic free layer FL1, the second tunnel barrier layer 115 and the reference layer 116 are collectively referred to as an upper MTJ stack MTJ1 or a Spin-Transfer-Torque (STT) Magnetic Tunnel Junction (MTJ) stack MTJ1 throughout the description. The lower MTJ stack MTJ2 is a Spin-Orbit-Torque (SOT) MTJ stack. The upper MTJ stack MTJ1 is a Spin-Transfer-Torque (STT) MTJ stack. For example, the SOT ferromagnetic free layer FL2 is switched by spin Hall effect (SHE) or Rashba effect, and the STT ferromagnetic free layer FL1 is switched by STT effect. As a result, the lower MTJ stack MTJ2 is also referred to as a Spin-Orbit-Torque (SOT) Magnetic Tunnel Junction (MTJ) stack. The upper MTJ stack MTJ1 is also referred to as a Spin-Transfer-Torque (STT) Magnetic Tunnel Junction (MTJ) stack.

The SOT ferromagnetic free layer FL2 has a magnetic orientation that is free to be switched by the spin Hall effect (SHE) or Rashba effect when applying an in-plane current through the SOT bottom electrode 104 that is sufficient to switch the magnetic orientation of the SOT ferromagnetic free layer FL2. In contrast, the STT ferromagnetic free layer FL1 has a magnetic orientation that is free to be switched by the STT effect when the MTJ stack MTJ1 receives a perpendicular-to-plane current that is sufficient to switch the magnetic orientation of the STT ferromagnetic free layer FL1. Therefore, the SOT ferromagnetic free layer FL2 is capable of changing its magnetic orientation between one of two states, which cause two different MTJ2 resistances that correspond to binary data states stored in the lower MTJ stack MTJ2; the STT ferromagnetic free layer FL1 is also capable of changing its magnetic orientation between one of two states, which cause two different MTJ1 resistances that correspond to binary data states stored in the upper MTJ stack MTJ1. As a result, the SOT-STT hybrid MRAM cell 12 has quaternary data states (i.e., four data states) attributing to the MTJ1 binary data states and the MTJ2 binary data states.

Each of the SOT ferromagnetic free layer FL2 and the STT ferromagnetic free layer FL1 includes ferromagnetic materials and can be a single layer or a multilayer structure. For example, the SOT ferromagnetic free layer FL2 and the STT ferromagnetic free layer FL1 can be a single layer formed by iron (Fe), cobalt (Co), Fe/Co-based alloy, cobalt-iron-boron (CoFeB), CoFe, FeB or the like in some embodiments. The SOT ferromagnetic free layer FL2 and the STT ferromagnetic free layer FL1 can be a tri-layer structure formed by a spacer layer sandwiched between two ferromagnetic layers in some other embodiments. For example, the SOT ferromagnetic free layer FL2 and the STT ferromagnetic free layer FL1 may be a tri-layer structure formed by CoFeB layers sandwiching a spacer layer including non-magnetic materials (e.g., Tantalum (Ta)). The tunnel barrier layers 113, 115 can be magnesium oxide (MgO), aluminum oxide ($Al_2O_3$), or else compound.

The SAF layer 106 can serve to pin the magnetic direction of the reference layer 116 in a fixed direction. Pinning the magnetic direction of the reference layer 116 allows the upper MTJ stack MTJ1 to be toggled between the low-resistance state and the high-resistance state by changing the magnetic orientation of the STT ferromagnetic free layer FL1 relative to the reference layer 116. The SAF layer 106 may be a tri-layer structure formed by $[Co/Pt]_N$ multilayer 120, a synthetic anti-ferromagnetic (SAF) spacer 121 and $[Co/Pt]_N$ multilayer 122. The SAF spacer 121 may include Ru, Ir or the like and has a thickness in a range from 0.1 nm to 10 nm, for example, 0.1 nm to 5 nm. The cycle number (N) of the two $[Co/Pt]_N$ multilayers 120, 122 may be 1 to 10. The thickness of the $[Co/Pt]_N$ multilayers 120, 122 may be 0.1 nm to 100 nm.

In some embodiment, the lower MTJ stack MTJ2 is positioned on the SOT bottom electrode 104, which is a heavy metal layer, with large spin-orbit interaction. The SOT ferromagnetic free layer FL2 is in direct contact with the SOT bottom electrode 104. Spin torque is induced by the in-plane current injected through the SOT bottom electrode 104 under the spin-orbit coupling effect, which generally includes one or more of the Rashba effect or the spin Hall effect ("SHE effect").

The Rashba effect or the SHE effect consists in spin accumulation at the lateral boundaries of a current-carrying conductor (e.g., the SOT bottom electrode 104), the directions of the spins being opposite at the opposing boundaries. No magnetic field is needed for spin accumulation. The charge current flows in the SOT bottom electrode 104 such that the SHE effect produces spin ordering that results in spin diffusion and then spin accumulation. The spin accumulation is a consequence of the spin current in the SOT bottom electrode 104 and leads to an accumulation of electrons at a surface of the SOT bottom electrode 104 with a common spin state (e.g., spin-up or spin-down). The spin accumulation is transferred into the SOT ferromagnetic free layer FL2, which induces magnetic precession and/or switching of a magnetization direction of the SOT ferromagnetic free layer FL2.

The write current does not pass through the lower MTJ stack and the upper MTJ stack in a vertical direction. Instead, the write current passes through the SOT bottom electrode 104 in an in-plane direction. The magnetization polarity in the SOT ferromagnetic free layer FL2 is set through the spin Hall effect (SHE) or Rashba effect. More specifically, when a current is injected in-plane in the SOT bottom electrode 104, the spin orbit coupling leads to an orthogonal spin current which creates a spin torque and induce magnetization reversal in the SOT ferromagnetic free layer FL2. Parallel magnetizations ("P state") lead to a lower electrical resistance because it is more likely that electrons will tunnel through the tunnel barrier layer, whereas anti-parallel magnetizations ("AP state") lead to a higher electrical resistance because it is less likely that electrons will tunnel through the tunnel barrier layer. The P state of the lower MTJ stack MTJ2 is defined as logic "0" and the AP state as logic "1."

In some embodiments, the reference layer 116 is formed over the second tunnel barrier layer 115. The reference layer 116 has a magnetic orientation that is "fixed," because the magnetic orientation of the reference layer 116 is pinned by the SAF layer 106, as discussed previously. In the upper MTJ stack MTJ1, the information is stored in the magnetic state of the STT ferromagnetic free layer FL1. The reference layer 116 provides a reference frame required for reading and writing. The upper MTJ stack MTJ1 functionality is powered by two phenomena: the tunneling magnetoresistance (TMR) effect for reading and the spin-transfer torque (STT) effect for writing. The TMR effect causes the resistance of the upper MTJ stack MTJ1 to depend significantly on the relative orientation of the magnetic layers: the resistance in the antiparallel state (AP state) can be several times larger than in the parallel state (P state). It enables the magnetic state of the STT ferromagnetic free layer FL1 to be sensed and thus, stored information to be read. The STT effect enables electrons flowing through the upper MTJ stack MTJ1 to transfer spin angular momentum between the reference layer 116 and the STT ferromagnetic free layer FL1, which results in a torque on the magnetization of the STT ferromagnetic free layer FL1. This enables the magnetic state of the STT ferromagnetic free layer FL1 to be changed if the torque is sufficiently strong, thus information can be written. That is, due to the tunnel magnetoresistance effect, the resistance value between the reference layer 116 and the STT ferromagnetic free layer FL1 changes with the magnetization polarity switch in the STT ferromagnetic free layer FL1. The P state of the upper MTJ stack MTJ1 is defined as logic "0" and the AP state as logic "1." An easy axis of the SOT ferromagnetic free layer FL2 and the STT ferromagnetic free layer FL1 can be in-plane or perpendicular (along the z direction).

Figure 4A:
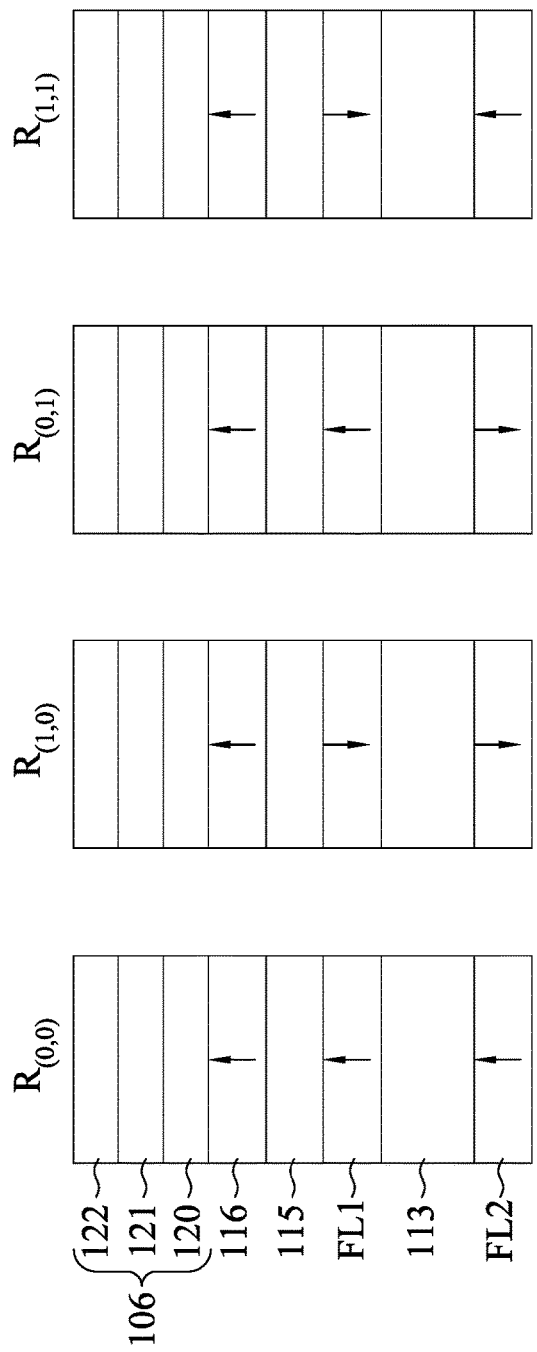
FIG. 4A illustrates magnetic orientations or polarities of a reference layer, an upper ferromagnetic free layer and a lower ferromagnetic free layer of the SOT-STT MRAM hybrid cell in accordance with some embodiments.

Reference is made to FIG. 4A, the magnetic orientations or polarities of the reference layer 116, the STT ferromagnetic free layer FL1 and the SOT ferromagnetic free layer FL2 are illustrated. In some embodiments, the reference layer 116 has a fixed magnetic orientation or polarity, e.g., in the up direction as shown by a unidirectional arrow, perpendicular to a substrate plane or a plane which the SOT-STT hybrid MRAM cell 12 sits on. In some embodiments, the reference layer 116 includes a suitable ferromagnetic material such as CoFeB, CoFe, FeB, Fe, the like, or a combination thereof. The magnetic orientations of the reference layer 116, the STT ferromagnetic free layer FL1 and the SOT ferromagnetic free layer FL2 of the SOT-STT hybrid MRAM cell 12 can result in four resistance states labeled as R (0,0), R (1,0), R (0,1) and R (1,1), which correspond to quaternary data states stored in the SOT-STT hybrid MRAM cell 12.

The resistance state R (0,0) represents that the upper MTJ stack MTJ1 is in parallel state (i.e., the magnetic orientations of the reference layer 116 and the STT ferromagnetic free layer FL1 are parallel), and lower MTJ stack MTJ2 is also in parallel state (i.e., the magnetic orientations of the STT ferromagnetic free layer FL1 and the SOT ferromagnetic free layer FL2 are parallel). The resistance state R (1,0) represents that the upper MTJ stack MTJ1 is in anti-parallel state (i.e., the magnetic orientations of the reference layer 116 and the STT ferromagnetic free layer FL1 are anti-parallel), and lower MTJ stack MTJ2 is in parallel state (i.e., the magnetic orientations of the STT ferromagnetic free layer FL1 and the SOT ferromagnetic free layer FL2 are parallel). The resistance state R (0,1) represents that the upper MTJ stack MTJ1 is in parallel state (i.e., the magnetic orientations of the reference layer 116 and the STT ferromagnetic free layer FL1 are parallel), and lower MTJ stack MTJ2 is in anti-parallel state (i.e., the magnetic orientations of the STT ferromagnetic free layer FL1 and the SOT ferromagnetic free layer FL2 are anti-parallel). The resistance state R (1,1) represents that the upper MTJ stack MTJ1 is in anti-parallel state (i.e., the magnetic orientations of the reference layer 116 and the STT ferromagnetic free layer FL1 are anti-parallel), and lower MTJ stack MTJ2 is also in anti-parallel state (i.e., the magnetic orientations of the STT ferromagnetic free layer FL1 and the SOT ferromagnetic free layer FL2 are anti-parallel).

Figure 4B:
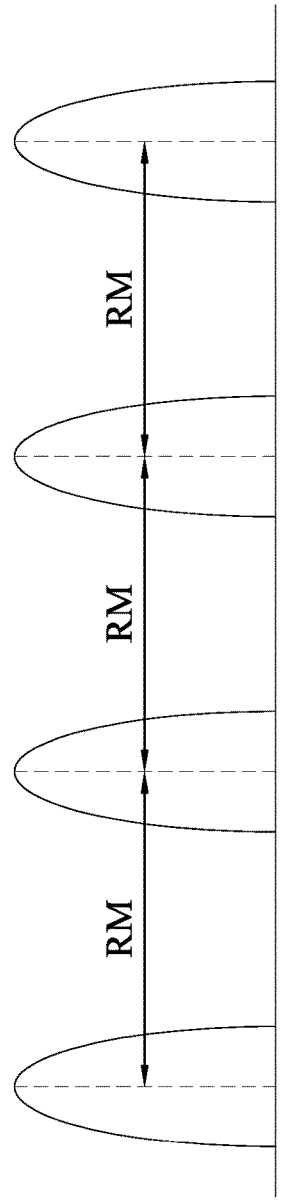
FIG. 4B illustrates read margins of the SOT-STT MRAM hybrid cell corresponding to FIG. 4A.

In some embodiments where the first tunnel barrier layer 113 has a thickness of 0.8 nm to 1.0 nm, such as 0.9 nm, the resistance of the lower MTJ stack MTJ2 is about 8.4 kΩ in the P state and about 21.2 kΩ in the AP state. In some embodiments where the second tunnel barrier layer 115 has a thickness of 0.7 nm to 0.9 nm, such as 0.8 nm, the resistance of the upper MTJ stack MTJ1 is about 4.2 kΩ in the P state and about 10.6 kΩ in the AP state. In this way, the resistance state R (0,0) would be about 12.6 kΩ. The resistance state R (1,0) would be about 19 kΩ. The resistance state R (0,1) would be about 25.4 kΩ. The resistance state R (1,1) would be about 31.8 kΩ. Such amounts of resistance states result would ensure an acceptable read margin RM (e.g., about 6.4 kΩ), as illustrated in FIG. 4B.

Referring back to FIG. 2 and FIG. 3, the lower MTJ stack MTJ2 and the upper MTJ stack MTJ1 have the same size in a top view. In other words, the lower MTJ stack MTJ2 has a top-view profile same as a top-view profile of the upper MTJ stack MTJ1. The shapes of the lower MTJ stack MTJ2 and the upper MTJ stack MTJ1 can be circular, elliptical, rectangular or square and with or without rounded corners. In some embodiments where the lower MTJ stack MTJ2 and the upper MTJ stack MTJ1 have circular top view, the diameter dl of the layers of the lower MTJ stack MTJ2 and the upper MTJ stack MTJ1 are the same. For example, the reference layer 116, the second tunnel barrier layer 115, the STT ferromagnetic free layer FL1, the first tunnel barrier layer 113 and the SOT ferromagnetic free layer FL2 have the same diameter dl. In some embodiments, the diameters of the tunnel barrier layers 115, 113, the STT ferromagnetic free layer FL1 and the SOT ferromagnetic free layer FL2 are in a range from 1 nm to 1 mm, such as 30 nm. As a result, the junction size of the lower MTJ stack MTJ2 and the junction size of the upper MTJ stack MTJ1 are in a range from 1 nm to 1 mm, such as 30 nm.

In some embodiments, the STT ferromagnetic free layer FL1 has a thickness same as a thickness of the SOT ferromagnetic free layer FL2. The resistances of the tunnel barrier layers 113, 115 are related to the sizes thereof. By controlling the thicknesses of the tunnel barrier layers 113, 115 being different from each other, the resistances of the lower MTJ stack MTJ2 and the upper MTJ stack MTJ1 can be tuned. Referring to FIG. 3, the first tunnel barrier layer 113 has a thickness t2 less than a thickness t1 of the second tunnel barrier layer 115. In this way, the resistance area (RA) product of the lower MTJ stack MTJ2 can be greater than the resistance area (RA) product of the upper MTJ stack MTJ1 such that the anti-parallel state resistance ($R_{ap}$) and the parallel state resistance ($R_p$) of the lower MTJ stack MTJ2 can be different from the anti-parallel state resistance (Rap) and the parallel state resistance ($R_p$) of the upper MTJ stack MTJ1, respectively. For example, the parallel state resistance ($R_p$) of the lower MTJ stack MTJ2 is greater than parallel state resistance ($R_p$) of the upper MTJ stack MTJ1, and the anti-parallel state resistance ($R_{ap}$) of the lower MTJ stack MTJ2 is greater than the anti-parallel state resistance ($R_{ap}$) of the upper MTJ stack MTJ1, because MTJ2 has a thicker tunnel barrier than upper MTJ stack MTJ1. However, in some other embodiments, the MTJ stacks have a different tunnel barrier thickness relationship. For example, the upper MTJ stack MTJ1 may have a thicker tunnel barrier thickness than lower MTJ stack MTJ2. In that case, the parallel state resistance ($R_p$) of the lower MTJ stack MTJ2 is less than parallel state resistance ($R_p$) of the upper MTJ stack MTJ1, and the anti-parallel state resistance ($R_{ap}$) of the lower MTJ stack MTJ2 is less than the anti-parallel state resistance ($R_{ap}$) of the upper MTJ stack MTJ1.

The resistance of the vertically stacked lower MTJ stack MTJ2 and the upper MTJ stack MTJ1 can be tuned by varying the thickness t1 of the second tunnel barrier layer 115 and the thickness t2 of the first tunnel barrier layer 113 without changing the diameters thereof. In this way, the lower MTJ stack MTJ2 and the upper MTJ stack MTJ1 can be patterned using the same mask and allow for doubled memory density without increasing the cell area. The fabrication process thereof is also fabrication-friendly in forming SOT MTJ cell.

The resistance area (RA) product of the lower MTJ stack MTJ2 and the upper MTJ stack MTJ1 increase as the thickness t1 of the first tunnel barrier layer 113 and the thickness of the second tunnel barrier layer 115 increases. In some embodiments, the thickness t2 of the second tunnel barrier layer 115 is greater than the thickness t1 of the first tunnel barrier layer 113. The thickness t1, t2 of the tunnel barrier layers 113, 115 may be in a range from 0.1 nm to 10 nm. The Resistance area (RA) of the lower MTJ stack MTJ2 and the upper MTJ stack MTJ1 is in a range from $0.1\Omega\text{-mm}^2$ to $10000\Omega\text{-mm}^2$. For example, in some embodiments where the first tunnel barrier layer 113 has a thickness of about 0.9 nm, the resistance area (RA) product of the lower MTJ stack is about $6\Omega\text{-}\mu\text{m}^2$. In some embodiments where the second tunnel barrier layer 115 has a thickness of about 0.8 nm, the resistance area (RA) product of the upper MTJ stack MTJ1 is about $3\Omega\text{-}\mu\text{m}^2$. Each of the lower MTJ stack MTJ2 and the upper MTJ stack MTJ1 has a tunneling magnetoresistance (TMR) ratio in a range from 1% to 1000%, such as 150%.

Figure 5:
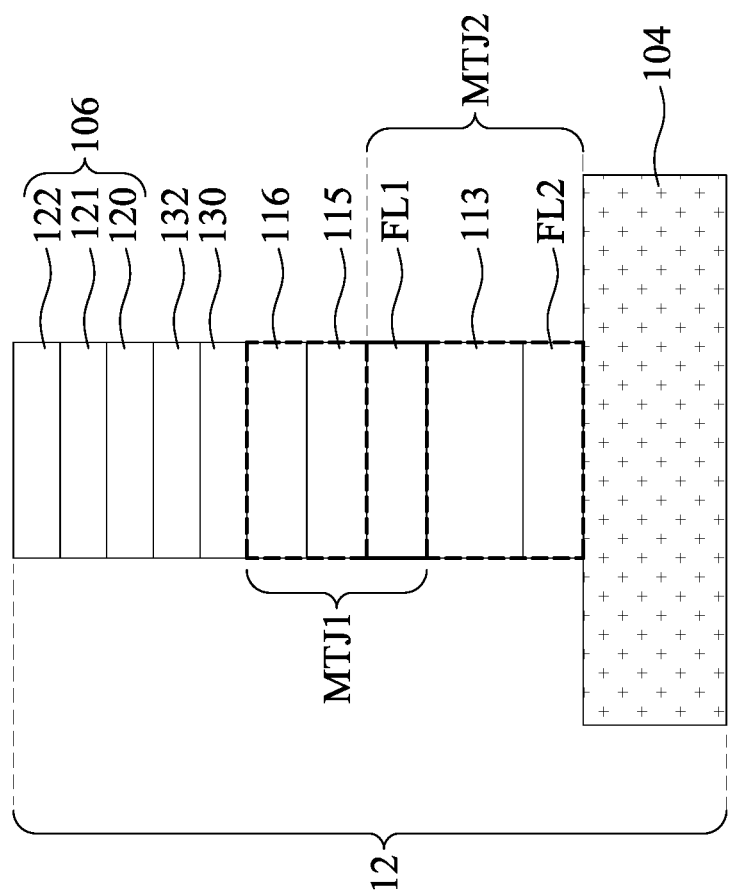
FIG. 5 is a schematic cross-sectional view of a SOT-STT hybrid MRAM cell in accordance with some other embodiments.

FIG. 5 is a schematic cross-sectional view of a SOT-STT hybrid MRAM cell 12a in accordance with some other embodiments. Reference is made to FIG. 5. The SOT-STT hybrid MRAM cell 12a is similar to the SOT-STT hybrid MRAM cell 12 in FIG. 3, except for the SOT-STT hybrid MRAM cell 12a further including a spacer layer 130 and an overlying buffer layer 132 on the reference layer 116. The material of the spacer layer 130 may include Tantalum (Ta), tungsten (W), molybdenum (Mo), or the like. The spacer layer 130 is configured to absorb the boron from the reference layer 116, which may include CoFeB, and break the texture of a body-centered cubic (bcc) lattice of the CoFeB. Therefore, the spacer layer 130 refers to a boron absorption layer or a diffusion barrier. The buffer layer 132 may include Platinum (Pt), Ta, ruthenium (Ru), or the like. The buffer layer 132 provides crystallinity of face-centered cubic (fcc) lattice for the overlying synthetic antiferromagnetic (SAF) layer 106. The buffer layer 132 may include Iridium Manganese (IrMn), synthetic antiferromagnetic (SAF) material (e.g. $[Co/Pt]_N$ multilayer/SAF spacer/$[Co/Pt]_N$ multilayer) in which the SAF spacer may include Ru, Jr or the like and has a thickness in a range from 0.1 nm to 10 nm, the cycle number (N) of the two $[Co/Pt]_N$ multi-layers may be from 1 to 10, and the thickness of the $[Co/Pt]_N$ multi-layers may be from 0.1 nm to 100 nm.

Figure 6:
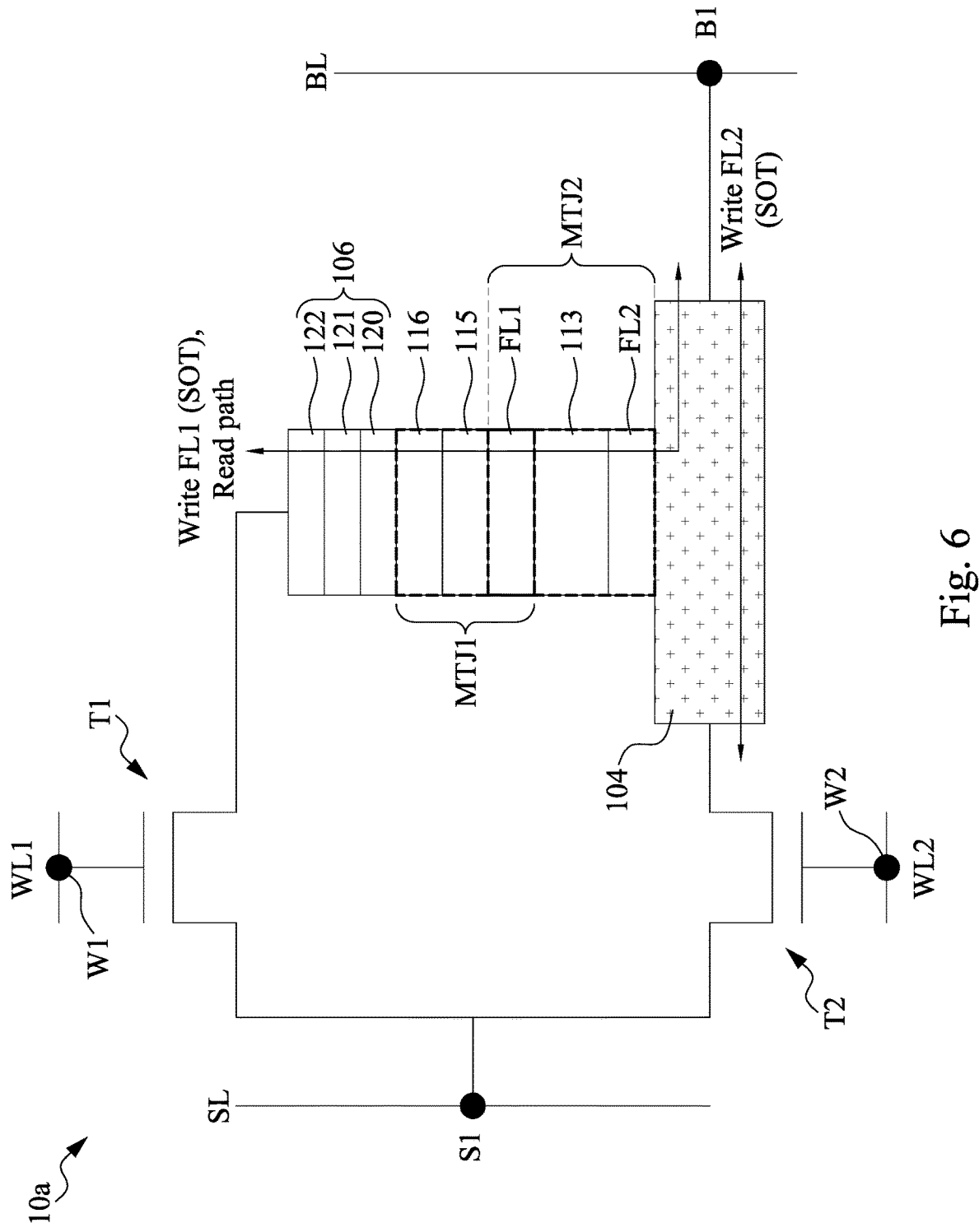
FIG. 6 illustrates a schematic circuit diagram of an SOT-STT hybrid MRAM cell in some embodiments.

FIG. 6 illustrates a schematic circuit diagram of an SOT-STT hybrid MRAM cell in some embodiments. FIG. 7 illustrates a table of various voltages served to operate the circuit of FIG. 6. The SOT-STT hybrid MRAM cell includes two access transistors T1, T2. A bit line BL is coupled to a first terminal (e.g., right side in the drawing) of the SOT bottom electrode 104. A source line SL is coupled to a second terminal (e.g., left side in the drawing) of the SOT bottom electrode 104 through the access transistor T2, and is also coupled to a top end of the upper MTJ stack MTJ1 through the access transistor T1. A first word line WL1 is coupled to the gate terminal of the access transistor T1. A second word line WL2 is coupled to the gate terminal of the access transistor T2. In greater detail, the access transistor T1 has a first source/drain terminal coupled to the reference layer 116 of the upper MTJ stack MTJ1, which is a STT MTJ, a second source/drain terminal coupled to the source line SL, and a gate terminal coupled to the first word line WL1; the access transistor T2 has a first source/drain terminal coupled to the second terminal of the SOT bottom electrode 104, a second source/drain terminal coupled to the source line SL, and a gate terminal coupled to the second word line WL2.

In write operations of the SOT ferromagnetic free layer FL2, the access transistor T2 is turned on by applying a voltage $V_{DD}$ to the second word line WL2 greater than the threshold voltage of the access transistor T2, the access transistor T1 is kept off by applying zero voltage to the first word line WL1, a conductive path is thus formed between the source line SL and the bit line BL through the SOT bottom electrode 104. The bit line voltage and the source line voltage thus form a potential difference that causes a current to flow through the SOT bottom electrode 104. In some cases, small current (smaller than the current flowing through the SOT bottom electrode 104) may flow inside the MTJ stacks MTJ1, MTJ2 in the write operations of the SOT ferromagnetic free layer FL2, and such current may be stopped by the first tunnel barrier layer 113. If the bit line voltage is 0 volt (V), and the source line voltage is $V_{DD}$, the SOT ferromagnetic free layer FL2 is switched from a second magnetic orientation (e.g., in downward direction) to a first magnetic orientation (e.g., in upward direction) by the spin Hall effect (SHE) or Rashba effect. If the bit line voltage is $V_{DD}$, and the source line voltage is 0, the SOT ferromagnetic free layer FL2 is switched from the first magnetic orientation to the second magnetic orientation by the spin Hall effect (SHE) or Rashba effect. An external magnetic field is required to break the symmetry if the anisotropy of the SOT ferromagnetic free layer FL2 is perpendicular. In this example, the spin Hall angle is positive and the magnetic field direction is from the right hand side to the left hand side of the SOT bottom electrode 104 in FIG. 6.

In write operations of the STT ferromagnetic free layer FL1, the access transistor T1 is turned on by applying a voltage $V_{DD}$ to the first word line WL1 greater than the threshold voltage of the access transistor T1, the access transistor T2 is kept off by applying zero voltage to the first word line WL2, a conductive path is thus formed between the source line SL and the bit line BL through the MTJ stacks MTJ1, MTJ2, and the SOT bottom electrode 104. The bit line voltage and the source line voltage thus form a potential difference that causes a current to flow through the MTJ stacks and the SOT bottom electrode 104. In some embodiments, the reference layer 116 is pinned to have the first magnetic orientation (i.e., upward direction). If the bit line voltage is $V_{DD}$, and the source line voltage is 0, the STT ferromagnetic free layer FL1 is switched from the second magnetic orientation (e.g., in downward direction) to the first magnetic orientation (e.g., in upward direction) by the STT effect. If the bit line voltage is 0, and the source line voltage is $V_{DD}$, the STT ferromagnetic free layer FL1 is switched from the first magnetic orientation to the second magnetic orientation.

In writing the hybrid MRAM cell of FIG. 6, the STT write operation to the STT ferromagnetic free layer FL1 is performed first since the STT write operation may distribute the state of SOT ferromagnetic free layer FL2 in some embodiment (not the case of the simulation), followed by performing the SOT write operation to the SOT ferromagnetic free layer FL2. In some embodiments that the reference layer 116 is pinned to have the first magnetic orientation (i.e., upward direction), after the STT write operation and SOT writhe operation are both complete, the hybrid MRAM cell will have a first resistance state R (0,0) if both the STT ferromagnetic free layer FL1 and the SOT ferromagnetic free layer FL2 are in the first magnetic orientation; the hybrid MRAM cell will have a second resistance state R (0,1) if the STT ferromagnetic free layer FL1 is in the first magnetic orientation but the SOT ferromagnetic free layer FL2 is in the second magnetic orientation (i.e., downward direction); the hybrid MRAM cell will have a third resistance state R (1,0) if both the STT ferromagnetic free layer FL1 and the SOT ferromagnetic free layer FL2 are in the second magnetic orientation; and the hybrid MRAM cell will have a resistance R (1,1) if the STT ferromagnetic free layer FL1 is in the second magnetic orientation but the SOT ferromagnetic free layer FL2 is in the first magnetic orientation.

In read operation of the hybrid MRAM cell of FIG. 6, the access transistor T1 is turned on by applying a voltage $V_{DD}$ to the first word line WL1 greater than the threshold voltage of the access transistor T1, the access transistor T2 is kept off by applying a voltage 0 to the second word line WL2, a conductive path is thus formed between the source line SL and the bit line BL through the MTJ stacks MTJ1, MTJ2 and through the SOT bottom electrode 104. A non-zero read voltage VREAD is applied to the bit line BL, and a zero voltage is applied to the source line SL, which in turn forming a potential difference that causes a read current to flow through the MTJ stacks and the SOT bottom electrode 104, thereby reading out the data stored in the hybrid MRAM cell. In some embodiments, the read voltage VREAD may be less than $V_{DD}$ so as to prevent read disturbance. For example, if the read voltage $V_{READ}$ is equal to $V_{DD}$, the read current flowing through the MTJ stacks may switch the magnetic orientation of the STT ferromagnetic free layer FL1, thus leading to read disturbance that causes the date stored in the hybrid MRAM cell to be lost.

Figure 8:
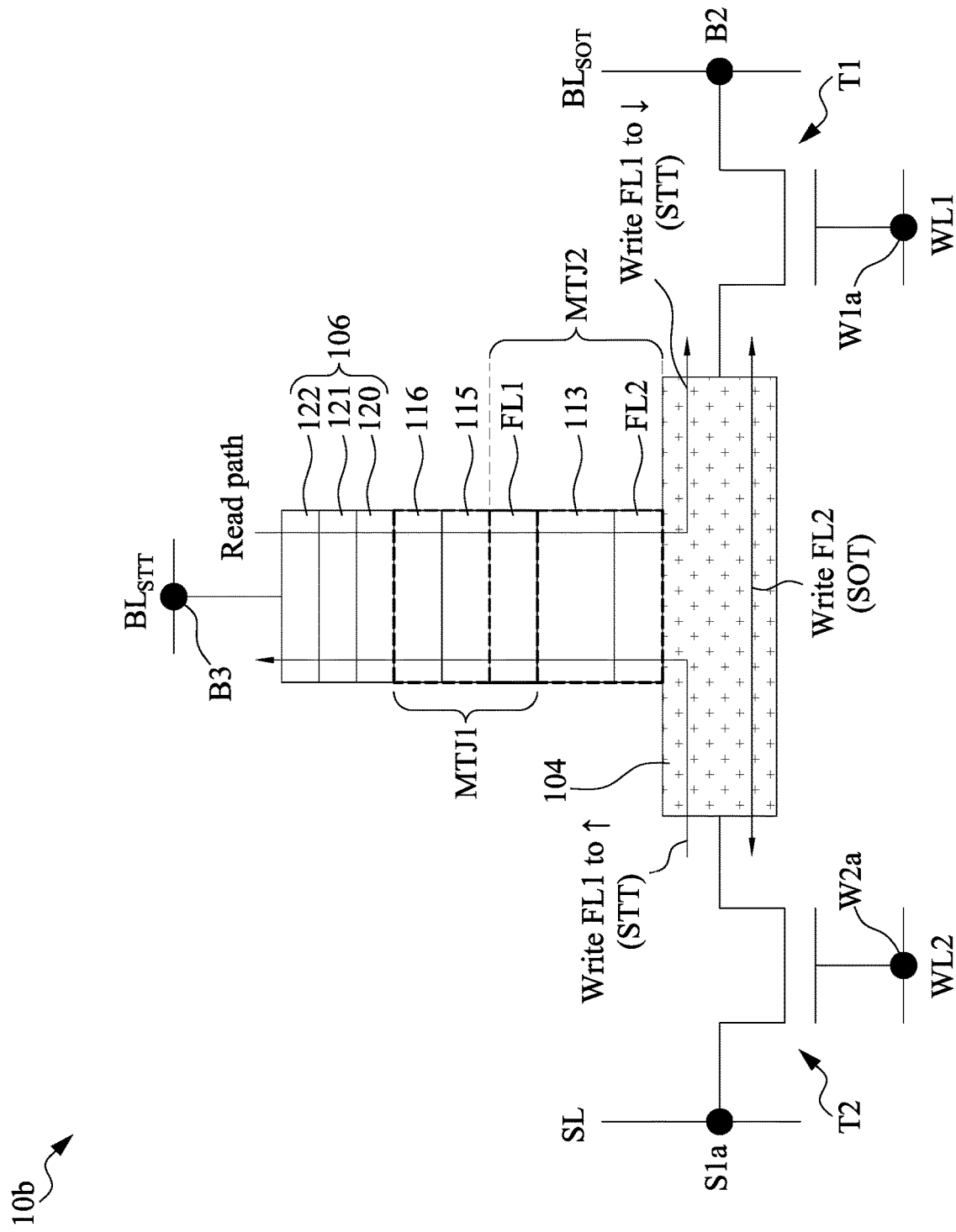
FIG. 8 illustrates a schematic circuit diagram of an SOT-STT hybrid MRAM cell in some embodiments.

FIG. 8 illustrates a schematic circuit diagram of an SOT-STT hybrid MRAM cell in some embodiments. FIG. 9 illustrates a table of various voltages served to operate the circuit of FIG. 8. In FIG. 8, an STT bit line $BL_{STT}$ is coupled to a top end of the upper MTJ stack, and an SOT bit line $BL_{SOT}$ is coupled to a first terminal (e.g., right side in the drawing) of the SOT bottom electrode 104 through the access transistor T1. A source line SL is coupled to a second terminal (e.g., left side in the drawing) of the SOT bottom electrode 104 through the access transistor T2. A first word line WL1 is coupled to the gate terminal of the access transistor T1. A second word line WL2 is coupled to the gate terminal of the access transistor T2. In greater detail, the access transistor T1 has a first source/drain terminal coupled to the first terminal of the SOT bottom electrode 104, a second source/drain terminal coupled to the SOT bit line $BL_{SOT}$, and a gate terminal coupled to the first word line WL1; the access transistor T2 has a first source/drain terminal coupled to the second terminal of the SOT bottom electrode 104, a second source/drain terminal coupled to the source line SL, and a gate terminal coupled to the second word line WL2. The STT bit line $BL_{STT}$ is coupled to the reference layer 116 of the upper MTJ stack MTJ1, which is a STT MTJ.

In write operations of the SOT ferromagnetic free layer FL2, the access transistor T1 is turned on by applying a voltage $V_{DD}$ to the second word line WL2 greater than the threshold voltage of the access transistor T1, and the access transistor T2 is also turned on by applying a voltage $V_{DD}$ to the second word line WL2 greater than the threshold voltage of the access transistor T2, a conductive path is thus formed between the source line SL and the SOT bit line $BL_{SOT}$ through the SOT bottom electrode 104 The SOT bit line voltage and the source line voltage thus form a potential difference that causes a current to flow through the SOT bottom electrode 104. In some cases, small current (smaller than the current flowing through the SOT bottom electrode 104) may flow inside the MTJ stacks MTJ1, MTJ2 in the write operations of the SOT ferromagnetic free layer FL2, and such current may be stopped by the first tunnel barrier layer 113. If the SOT bit line voltage is 0 volt, and the source line voltage is $V_{DD}$, the SOT ferromagnetic free layer FL2 is switched from a second magnetic orientation (e.g., in downward direction) to a first magnetic orientation (e.g., in upward direction) by the spin Hall effect (SHE) or Rashba effect. If the SOT bit line voltage is $V_{DD}$, and the source line voltage is 0, the SOT ferromagnetic free layer FL2 is switched from the first magnetic orientation to the second magnetic orientation by the spin Hall effect (SHE) or Rashba effect. In the write operations of the SOT ferromagnetic free layer FL2, the STT bit line is kept with zero voltage. An external magnetic field is required to break the symmetry if the anisotropy of the SOT ferromagnetic free layer FL2 is perpendicular. In this example, the spin Hall angle is positive and the magnetic field direction is from the right-hand side to the left-hand side of the SOT bottom electrode in FIG. 8.

In a first write operation of the STT ferromagnetic free layer FL1, the access transistor T1 is kept off by applying a voltage 0 to the first word line WL1, the access transistor T2 is turned on by applying a voltage $V_{DD}$ to the second word line WL2 greater than the threshold voltage of the access transistor T2, a conductive path is thus formed between the source line SL and the STT bit line $BL_{STT}$ through the MTJ stacks MTJ1, MTJ2 and the SOT bottom electrode 104. The bit line voltage and the source line voltage thus form a potential difference that causes a current to flow through the MTJ stacks, and the SOT bottom electrode 104. In the first write operation of the STT ferromagnetic free layer FL1, the STT bit line voltage is 0, and the source line voltage is $V_{DD}$, which in turn switching the STT ferromagnetic free layer FL1 from the second magnetic orientation (e.g., in downward direction) to the first magnetic orientation (e.g., in upward direction) by the STT effect. In the first write operation of the STT ferromagnetic free layer FL1, the SOT bit line is kept with zero voltage.

In a second write operation of the STT ferromagnetic free layer FL1, the access transistor T2 is kept off by applying a voltage 0 to the second word line WL2, the access transistor T1 is turned on by applying a voltage $V_{DD}$ to the first word line WL1 greater than the threshold voltage of the access transistor T1, a conductive path is thus formed between the STT bit line $BL_{STT}$ and the SOT bit line $BL_{SOT}$ through the MTJ stacks MTJ1, MTJ2, and the SOT bottom electrode 104. The STT bit line voltage and the SOT bit line voltage thus form a potential difference that causes a current to flow through the MTJ stacks, and the SOT bottom electrode 104. In the second write operation of the STT ferromagnetic free layer FL1, the STT bit line voltage is $V_{DD}$, and the SOT bit line voltage is 0, which in turn switching the STT ferromagnetic free layer FL1 from the first magnetic orientation (e.g., in upward direction) to the second magnetic orientation (e.g., in downward direction) by the STT effect. In the second write operation of the STT ferromagnetic free layer FL1, the source line is kept with zero voltage, which in turn preventing source degeneration effect.

In writing the MRAM cell of FIG. 8, the STT write operation to the STT ferromagnetic free layer FL1 is performed first, followed by performing the SOT write operation to the SOT ferromagnetic free layer FL2. In some embodiments that the reference layer 116 is pinned to have the first magnetic orientation (i.e., upward direction), after the STT write operation and SOT writhe operation are both complete, the hybrid MRAM cell will have a first resistance state R (0,0) if both the STT ferromagnetic free layer FL1 and the SOT ferromagnetic free layer FL2 are in the first magnetic orientation; the hybrid MRAM cell will have a second resistance state R (0,1) if the STT ferromagnetic free layer FL1 is in the first magnetic orientation but the SOT ferromagnetic free layer FL2 is in the second magnetic orientation (i.e., downward direction); the hybrid MRAM cell will have a third resistance state R (1,0) if both the SIT ferromagnetic free layer FL1 and the SOT ferromagnetic free layer FL2 are in the second magnetic orientation; and the hybrid MRAM cell will have a resistance R (1,1) if the STT ferromagnetic free layer FL1 is in the second magnetic orientation but the SOT ferromagnetic free layer FL2 is in the first magnetic orientation.

In read operation of the hybrid MRAM cell of FIG. 8, the access transistor T1 is turned on by applying a voltage $V_{DD}$ to the first word line WL1 greater than the threshold voltage of the access transistor T1, the access transistor T2 is kept off by applying a zero voltage to the second word line WL2, a conductive path is thus formed between the SOT bit line $BL_{SOT}$ and the STT bit line $BL_{STT}$ through the MTJ stacks MTJ1, MTJ2 and the SOT bottom electrode 104. A non-zero read voltage $V_{READ}$ is applied to the SOT bit line $BL_{SOT}$, and a zero voltage is applied to the STT bit line $BL_{STT}$, which in turn forming a potential difference that causes a read current to flow through the MTJ stacks and the SOT bottom electrode 104, thereby reading out the data stored in the hybrid MRAM cell. In some embodiments, the read voltage $V_{READ}$ may be less than $V_{DD}$ so as to prevent read disturbance. In some embodiments, the source line is kept with zero voltage during the read operation.

Figure 10:
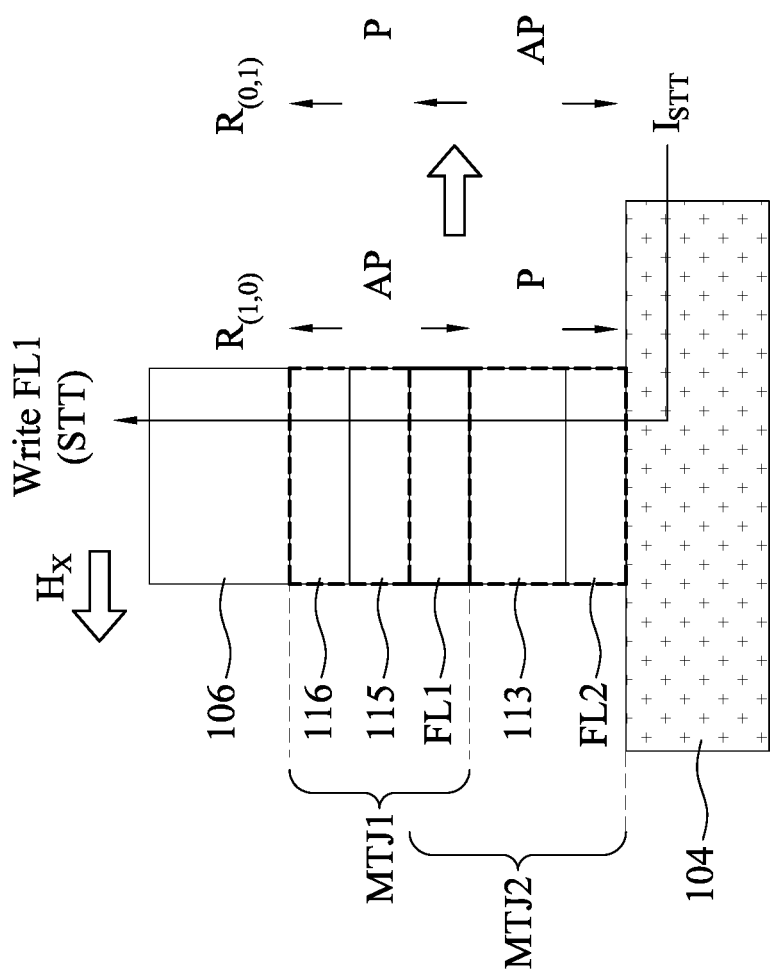
FIG. 10 illustrates a write operation using the STT effect in some embodiments of the present disclosure.
Figure 11:
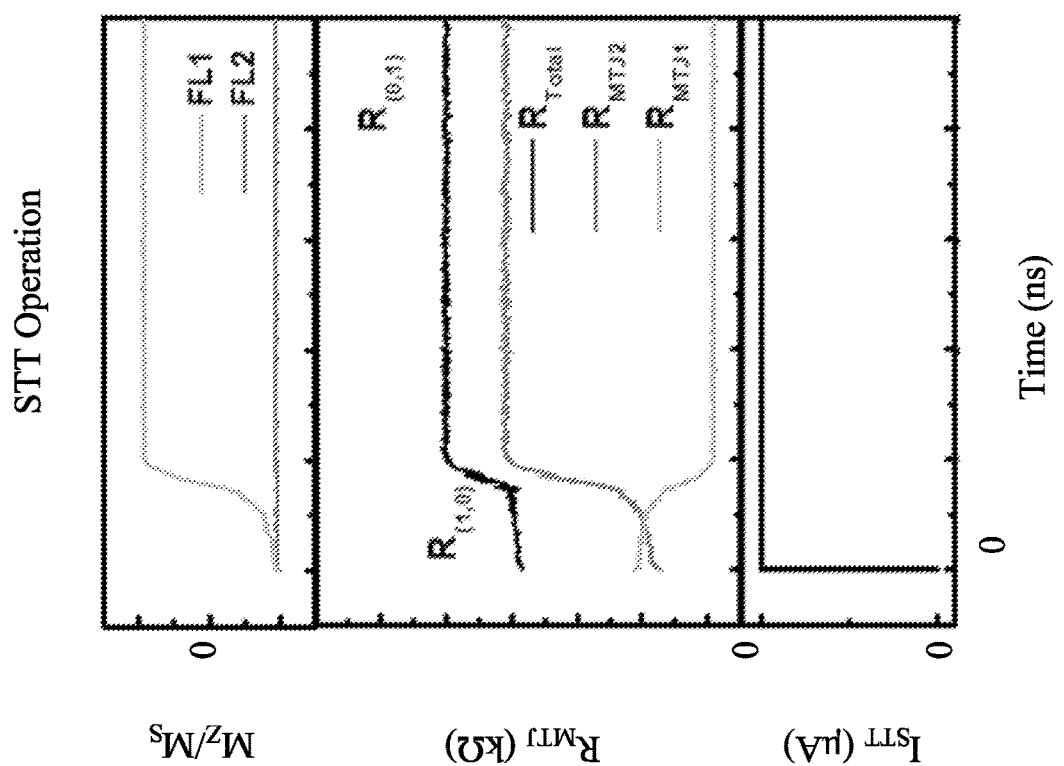
FIG. 11 illustrates simulation results of the STT write operation of FIG. 10.

FIG. 10 illustrates a write operation using the STT effect in some embodiments of the present disclosure. FIG. 11 illustrates simulation results of the STT write operation of FIG. 10. In some embodiments, the STT ferromagnetic free layer FL1 can be switched by a current $I_{STT}$ independently. For example, when a sufficient current $I_{STT}$ flows through the MTJ stacks, the STT ferromagnetic free layer FL1 is switched from the second magnetic orientation (e.g., in downward direction) to the first magnetic orientation (e.g., in upward direction), but the magnetic orientation of the SOT ferromagnetic free layer FL2 remains unchanged, as illustrated in the magnetization $M_Z/M_S$ in the first row in FIG. 11. In this way, the original parallel magnetic state (i.e., low resistance state) of the lower MTJ stack MTJ2 is switched to the anti-parallel magnetic state (i.e., high resistance state), the original anti-parallel magnetic state (i.e., high resistance state) of the upper MTJ stack MTJ1 is switched to the parallel magnetic state (i.e., low resistance state), and the total resistance of the MTJ stacks increases because the increasing in MTJ2 resistance is greater than the decreasing in MTJ1 resistance, as illustrated in the resistance $R_{MTJ}$ in the second row in FIG. 11. The hybrid MRAM cell is thus switched from the resistance state R (1,0) to the resistance state R (0,1). In some embodiments, a magnetic field $H_x$ is applied to the MTJ stacks, and the magnetic field $H_x$ is in a range from 290 to 310 Oe.

Figure 12:
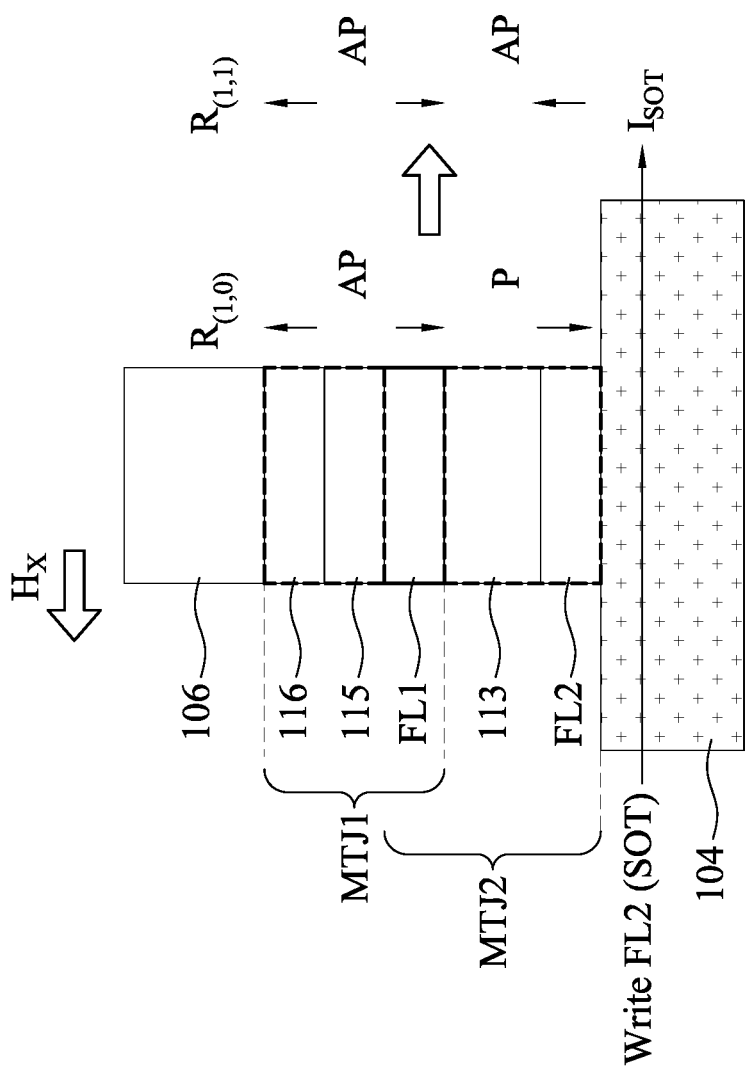
FIG. 12 illustrates an SOT write operation using the Spin Hall Effect (SHE) or Rashba effect in some embodiments of the present disclosure.
Figure 13:
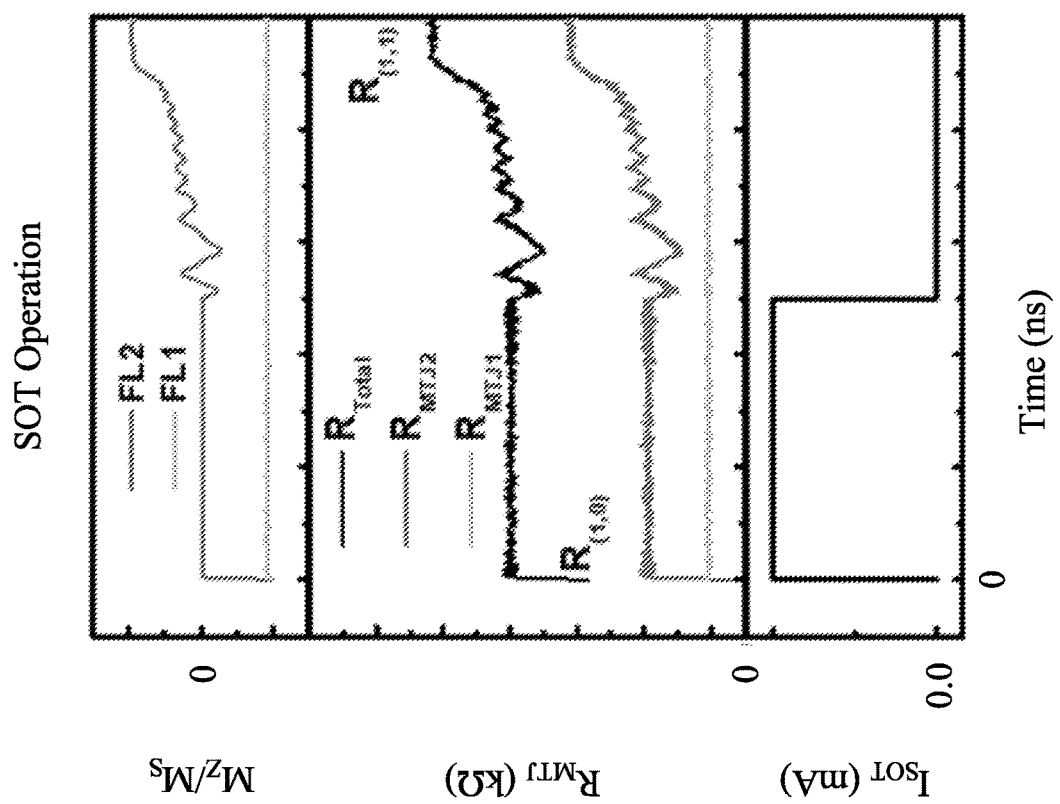
FIG. 13 illustrates simulation results of the SOT write operation of FIG. 12.

FIG. 12 illustrates a write operation using the spin Hall effect (SHE) or Rashba effect in some embodiments of the present disclosure. FIG. 13 illustrates simulation results of FIG. 12. In some embodiments, the SOT ferromagnetic free layer FL2 can be switched by a current ISOT independently. For example, when a sufficient current ISOT flows through the SOT bottom electrode 104, the SOT ferromagnetic free layer FL2 is switched from the second magnetic orientation (e.g., in downward direction) to the first magnetic orientation (e.g., in upward direction), but the magnetic orientation of the SOT ferromagnetic free layer FL2 remains unchanged, as illustrated in the magnetization MZ/MS in the first row in FIG. 13. In this way, the original parallel magnetic state (i.e., low resistance state) of the lower MTJ stack MTJ2 is switched to the anti-parallel magnetic state (i.e., high resistance state), the anti-parallel magnetic state (i.e., high resistance state) and the attendant resistance of the upper MTJ stack MTJ1 remains unchanged, and the increasing in the total resistance is substantially same as the increasing in MTJ2 resistance, as illustrated in the resistance RMTJ in the second row in FIG. 13. It is noted that the hard mask 124 has been omitted in FIGS. 5, 6, 8, 10 and 12 for the sake of clarity.

FIG. 14 is a table listing example parameters of the STT ferromagnetic free layer FL1 and the SOT ferromagnetic free layer FL2 in some embodiments of the present disclosure. In FIG. 14, when the write current $I_{STT}$ applied to the STT ferromagnetic free layer FL1 is 50±1 µA, the STT ferromagnetic free layer FL1 has a Gilbert damping constant ($\alpha$) of 0.005±0.0001, a saturation magnetization (Ms) of 800 emu/cm$^3$, an exchange stiffness ($A_{ex}$) of 20±2 (pJ/m), an interfacial anisotropy constant ($K_i$) of 1 (mJ/m$^2$) and a spin polarization of 0.65±0.1. When the write current $I_{SOT}$ applied to the SOT ferromagnetic free layer FL2 is 1.5±0.1 mA, the SOT ferromagnetic free layer FL2 has a Gilbert damping constant ($\alpha$) of 0.01±0.0001, a saturation magnetization (Ms) of 800±10 emu/cm$^3$, an exchange stiffness ($A_{ex}$) of 20±2 (pJ/m), an interfacial anisotropy constant ($K_i$) of 1 (mJ/m$^2$) and a spin polarization of 0.65±0.1.

In some embodiments, the spin hall angle ($\theta_{SH}$) of the hybrid MRAM cell 12 is from 0.3 to 0.4, such as 0.32. In some embodiments, the electrical resistivity of SOT ferromagnetic free layer FL2 is from 140 µΩ-cm to 160 µΩ-cm, such as 150 µΩ-cm. In some embodiments, the STT ferromagnetic free layer FL1 and the SOT ferromagnetic free layer FL2 have thicknesses of 1±0.1 nm. In some embodiments, the SOT bottom electrode 104 has a thickness of 3±0.1 nm. In some embodiments, the first tunnel barrier layer 113 has a thickness of about 1.2 nm. In some embodiments, the second tunnel barrier layer 115 has a thickness of about 1 nm. In some embodiments, the reference layer 116 has a thickness of 1.5 nm±0.1 nm.

The memory device 10 can be integrated at arbitrary interconnect levels in CMOS back-end-of-line (BEOL) platform for embedded memory applications. The memory device 10 is applicable for both stand-alone MRAM and embedded MRAM.

Figure 15A:
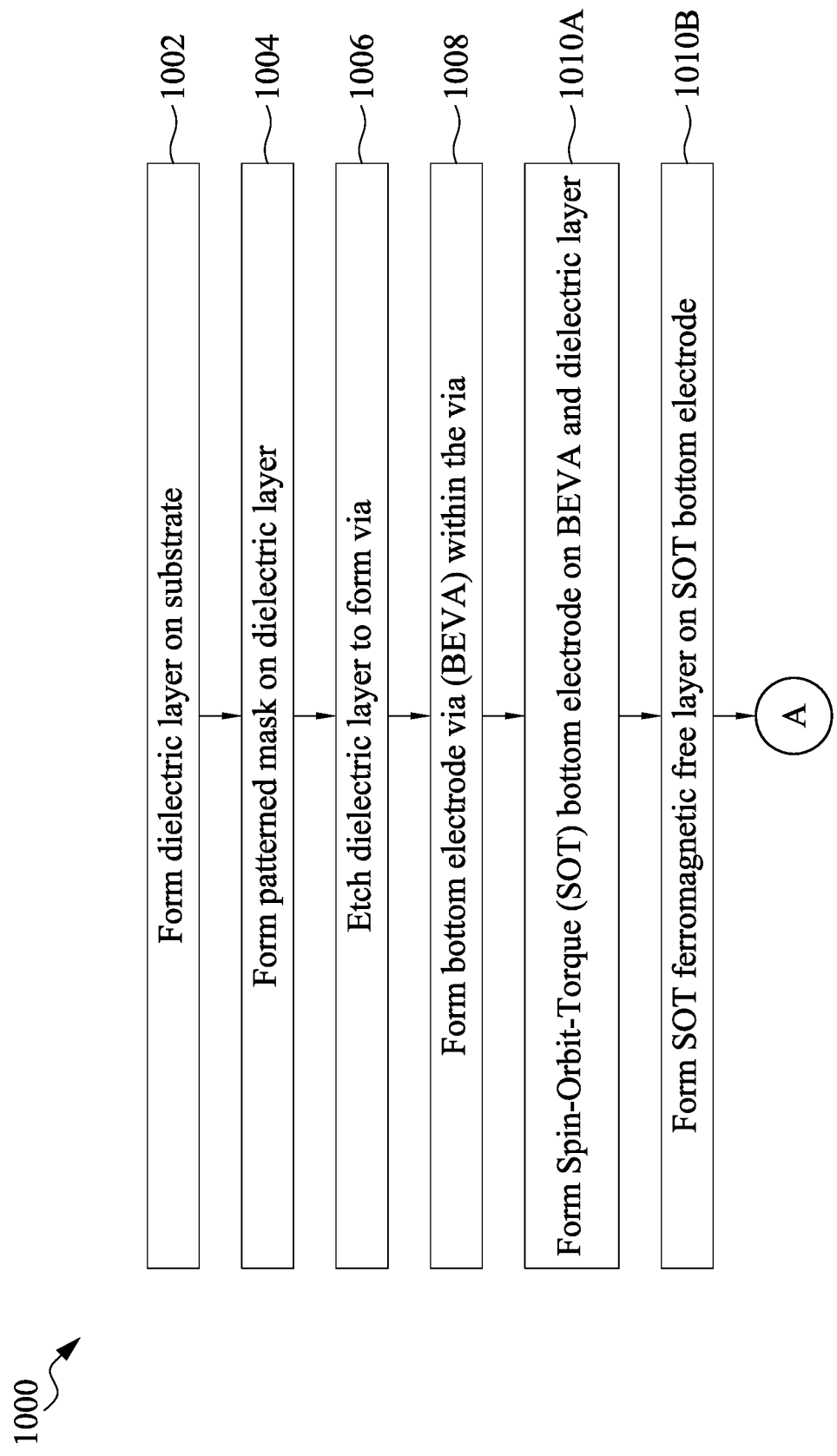
FIG. 15A, FIG. 15B and FIG. 15C are flow charts of a method of fabricating a memory device with a SOT-STT hybrid MRAM cell according to various aspects of the present disclosure.
Figure 15B:
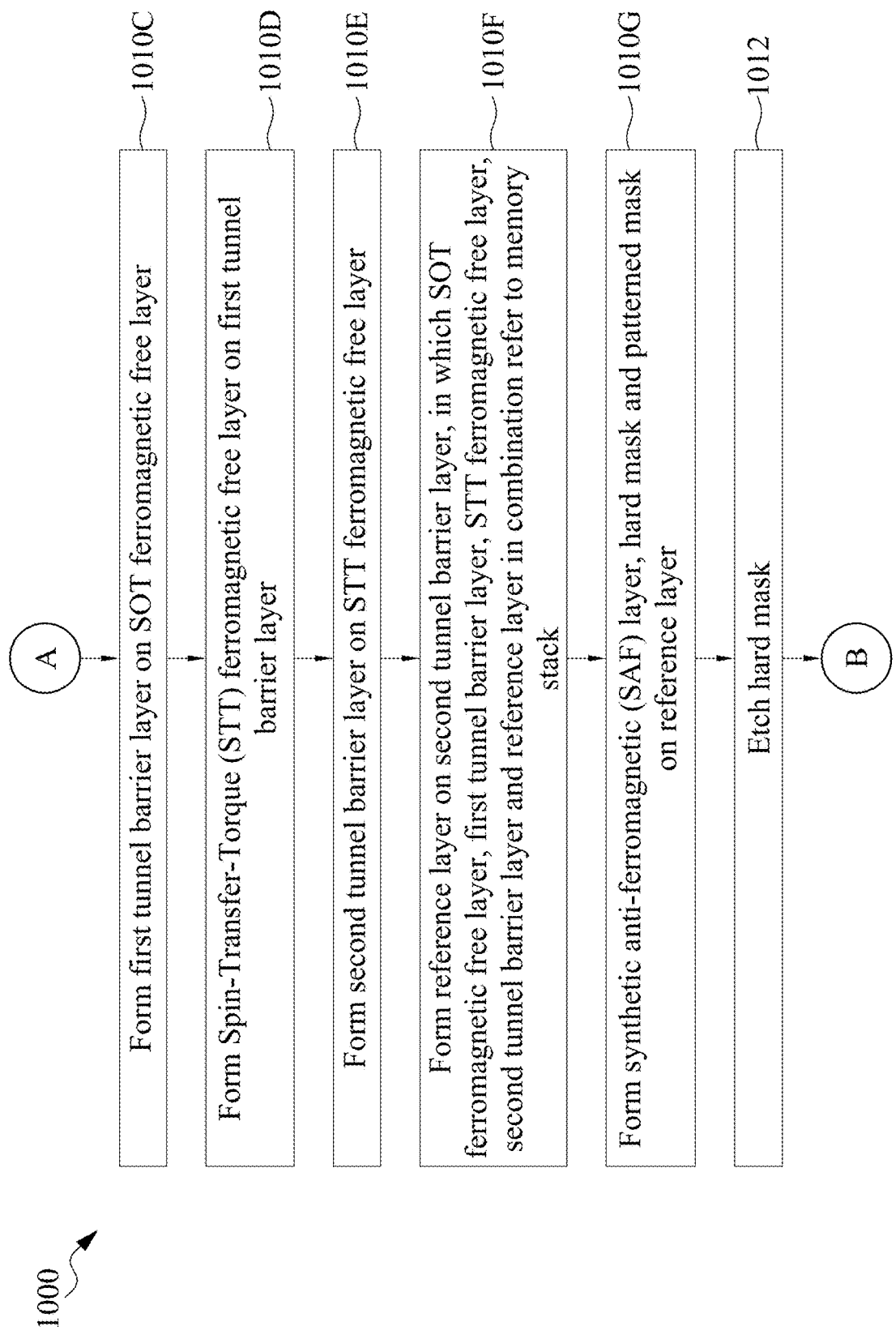
Figure 15C:
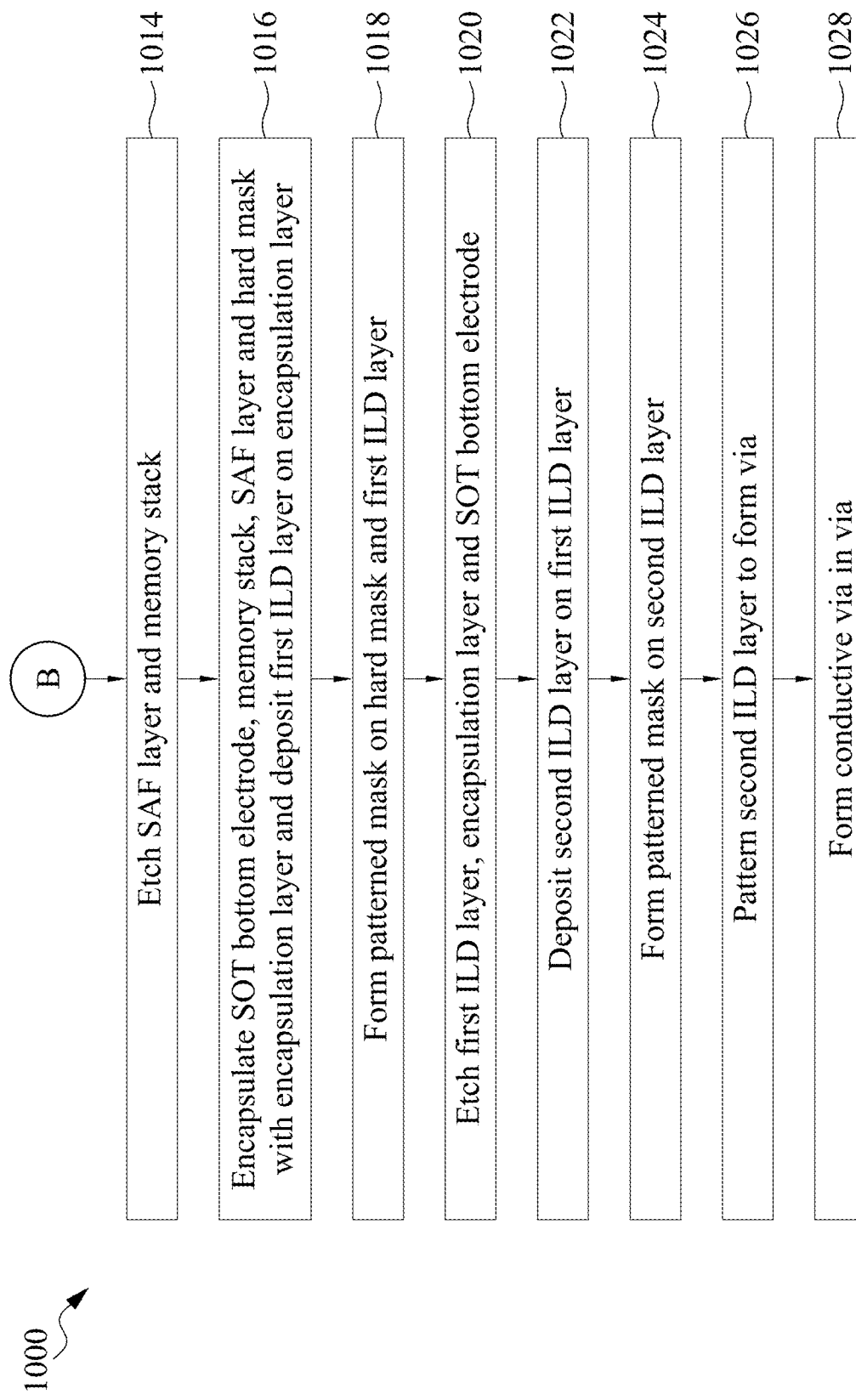
Figure 16:
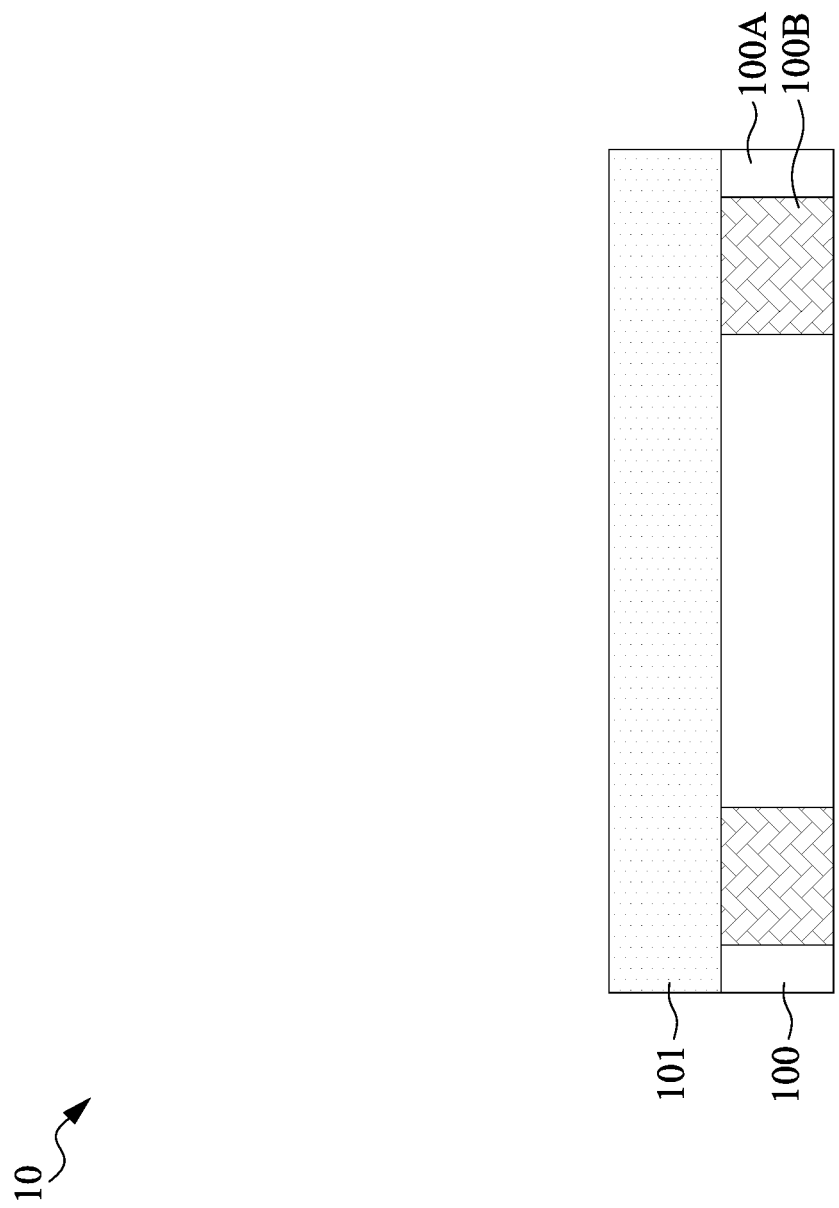
FIGS. 16-29 are cross-sectional views of the memory device at various stages of the method of fabricating the memory device according to various aspects of the present disclosure.

FIGS. 15A-15C are flow charts of a method 1000 of fabricating a memory device 10 with a SOT-STT hybrid MRAM cell 12 according to various aspects of the present disclosure. FIGS. 16-29 are cross-sectional views of the memory device 10 at various stages of the method 1000 of fabricating the memory device 10 according to various aspects of the present disclosure. Referring to block 1002 of FIG. 15A and to FIG. 16, a dielectric layer 101 is formed on a substrate 100. The dielectric layer 101 may have a thickness in a range from 1 nm to 1 µm. The dielectric layer 101 may be formed by acceptable deposition techniques, such as chemical vapor deposition (CVD), atomic layer deposition (ALD), physical vapor deposition (PVD), the like, and/or a combination thereof. A chemical-mechanical polish (CMP) process is optionally performed to the dielectric layer 101, until a desirable thickness is achieved. The dielectric layer 101 can be, for example, silicon dioxide layer, silicon carbide layer, silicon nitride layer, silicon oxycarbide layer, silicon oxynitride layer, low-k dielectric (e.g., having a dielectric constant of less than about 3.9) layer, extreme low-k (ELK) dielectric (e.g., having a dielectric constant of less than about 2.5) layer, the like, or combinations thereof.

Figure 17:
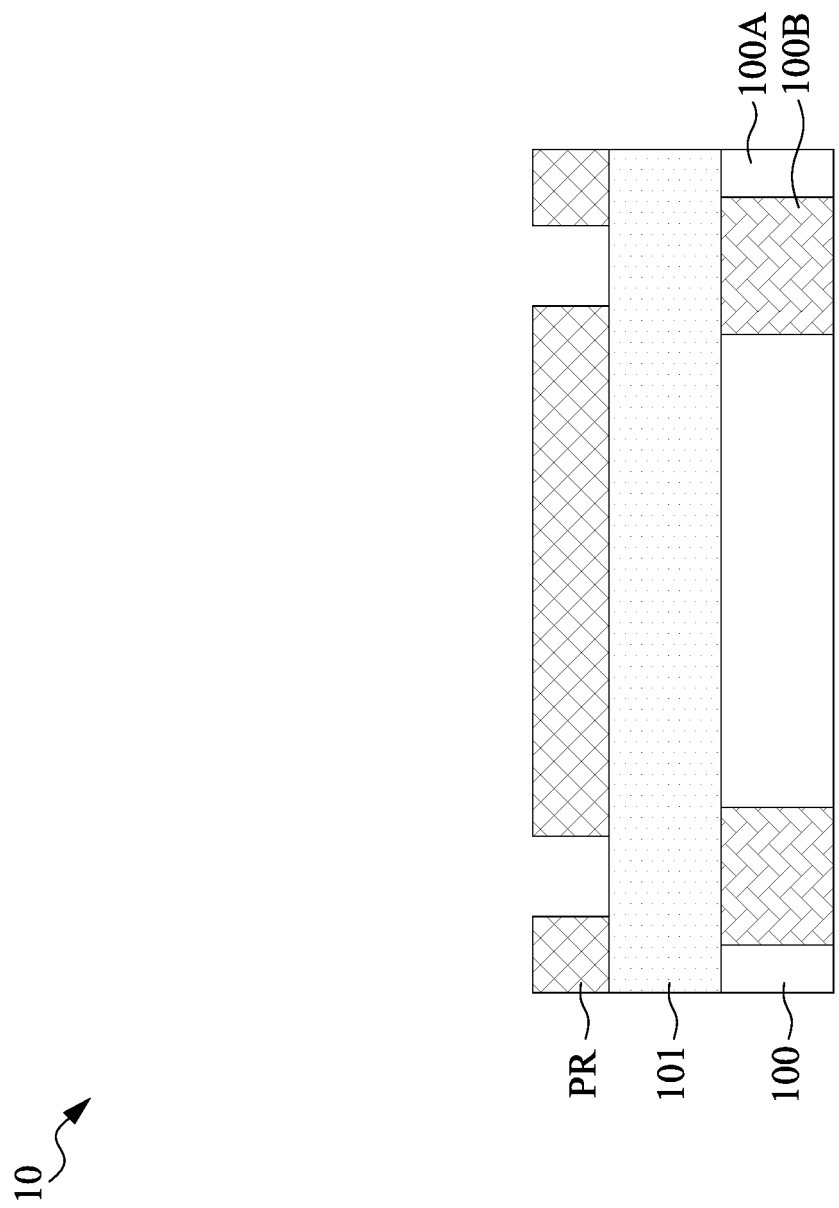

Referring to block 1004 of FIG. 15A and to FIG. 17, a patterned mask PR1 is formed over the dielectric layer 101. For example, a resist layer is formed over the dielectric layer 101 and then patterned into the patterned mask PR1 using a suitable photolithography process such that portions of the dielectric layer 101 are exposed by the patterned mask PR1. In some embodiments, the patterned mask PR1 is a photoresist. An exemplary photolithography process may include photoresist coating (e.g., spin-on coating), soft baking, mask aligning, exposure, post-exposure baking, developing the photoresist, rinsing, drying (e.g., hard baking), other suitable processes, or combinations thereof.

Figure 18:
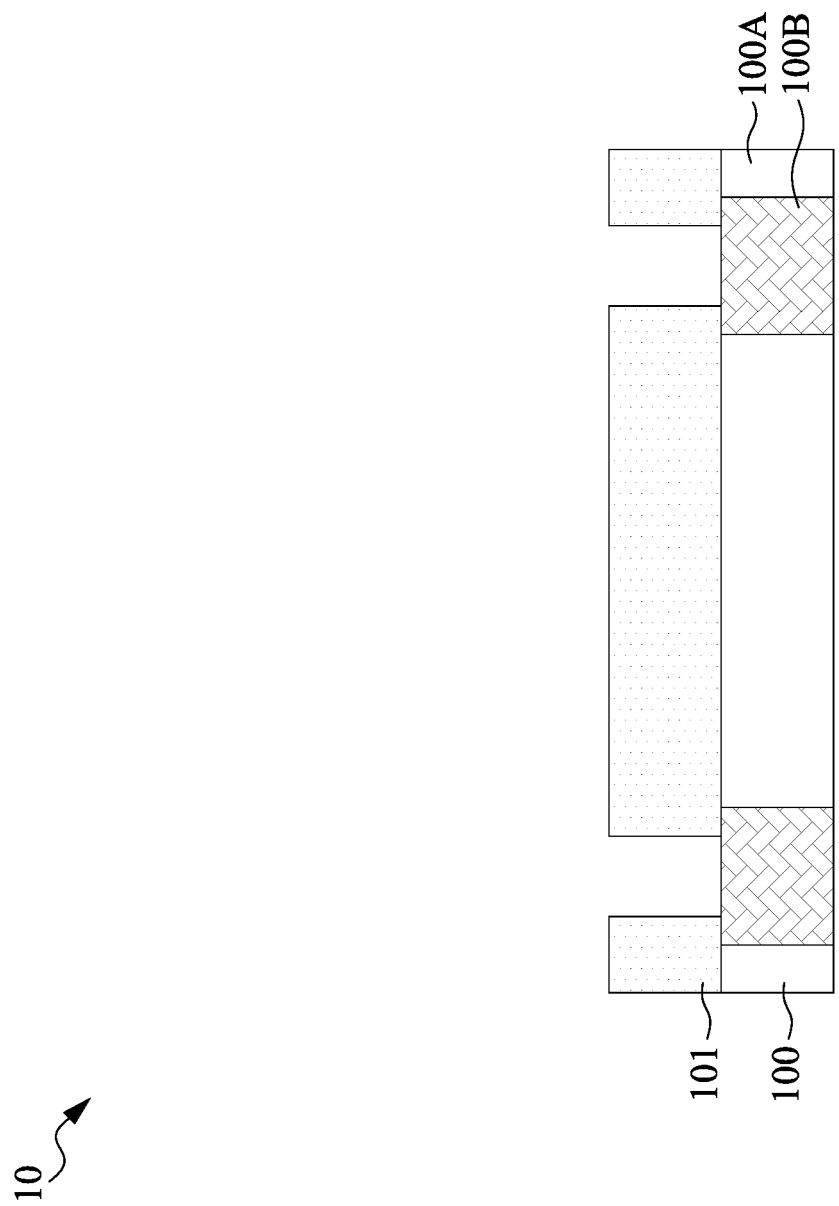

Referring to block 1006 of FIG. 15A and FIG. 18, the dielectric layer 101 is etched using the patterned mask PR1 as an etch mask to form via openings 101a in the dielectric layer 101. The patterned mask PR1 is then removed using suitable processes such as ashing.

Figure 19:
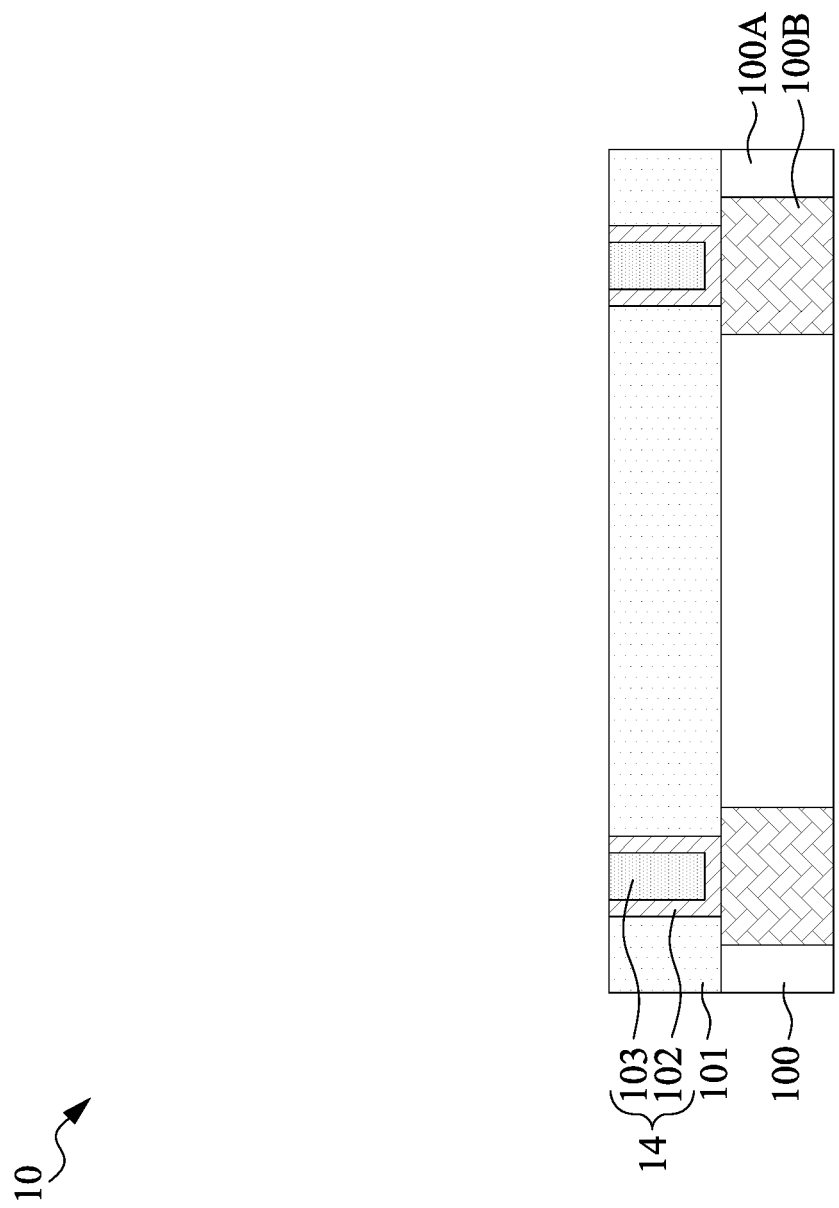

Referring to block 1008 of FIG. 15A and FIG. 19, two bottom electrode vias (BEVA) 14 are then formed within the via openings 101a of the dielectric layer 101. An exemplary formation method of the BEVAs 14 includes forming a diffusion barrier layer 102 lining the opening and then filling a filling metal 103 in a recess in the diffusion barrier layer 102, and performing a planarization process, such as a CMP process, to remove excess materials of the diffusion barrier layer 102 and the filling metal 103 outside the vias 101a in the dielectric layer 101. Formation of the filling metal 103 and the diffusion barrier layer 102 may be exemplarily performed using CVD, PVD, ALD, the like, and/or a combination thereof. The remaining filling metal 103 and the diffusion barrier layer 102 in the vias 101a in the dielectric layer 101 can serve as the BEVAs 14. Details of the materials of the diffusion barrier layer 102 and the filling metal 103 are discussed with regard to FIG. 1 and thus are not repeated herein. In some embodiments, the diffusion barrier layer 102 has a thickness in a range from 10 nm to 1 µm, and the filling metal 103 has a thickness in a range from 10 nm to 1 µm. In some embodiments, one BEVA 14 serves as a first terminal of SOT bottom electrode that is electrically coupled to bit line, and another BEVA serves as a second terminal of SOT bottom electrode that is electrically coupled to source line through an access transistor, thereby implementing the circuit as illustrated in FIG. 6. In some embodiments, one BEVA 14 serves as a first terminal of SOT bottom electrode that is electrically coupled to SOT bit line through a first access transistor, and another BEVA serves as a second terminal of SOT bottom electrode that is electrically coupled to source line through a second access transistor, thereby implementing the circuit as illustrated in FIG. 8.

Figure 20A:
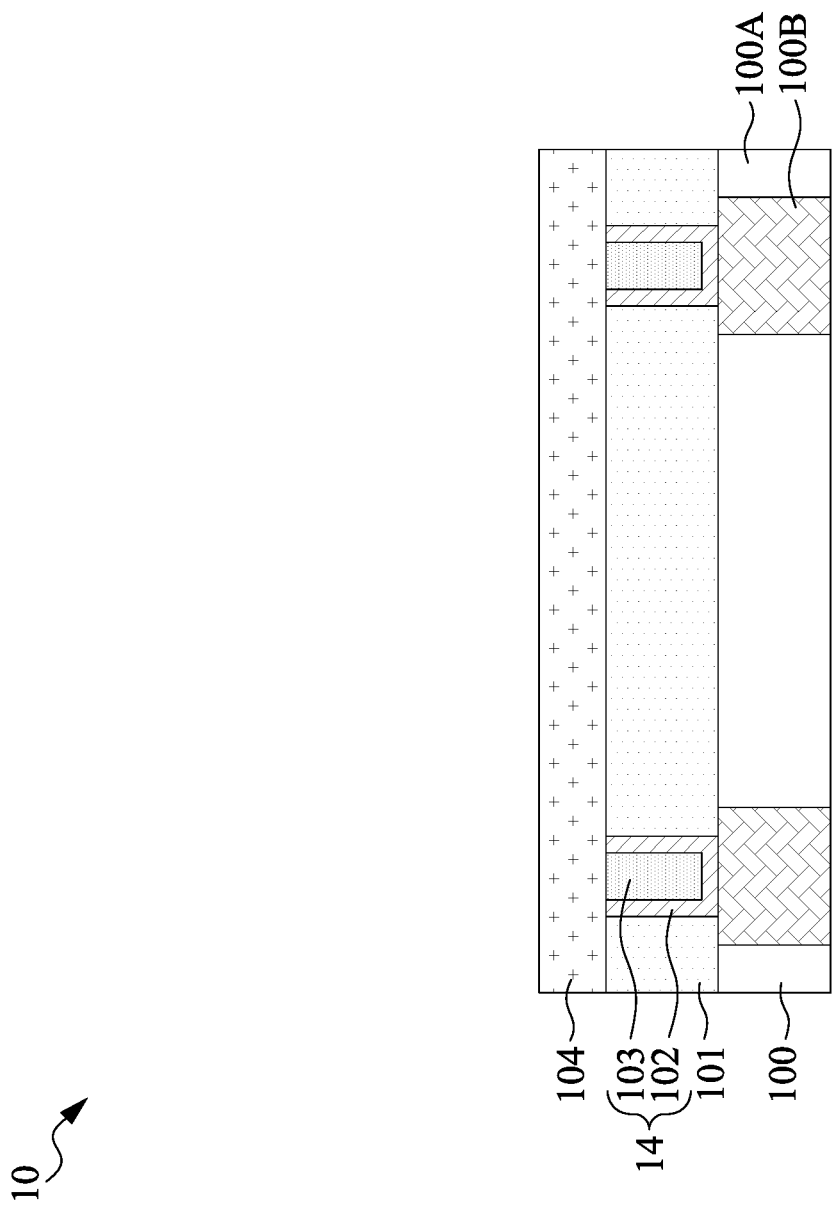

Referring to block 1010A of FIG. 15A and FIG. 20A, a Spin-Orbit-Torque (SOT) bottom electrode 104 is formed on the BEVAs 14 and the dielectric layer 101. In some embodiment, the SOT bottom electrode 104 may include Ta, W, Pt or the like and be formed by suitable film formation methods, which include physical vapor deposition (PVD) including sputtering, molecular beam epitaxy (MBE), pulsed laser deposition (PLD), atomic layer deposition (ALD), electron beam (e-beam) epitaxy, chemical vapor deposition (CVD), or derivative CVD processes further including low pressure CVD (LPCVD), ultrahigh vacuum CVD (UHVCVD), reduced pressure CVD (RPCVD), electro plating, or any combinations thereof.

Figure 20B:
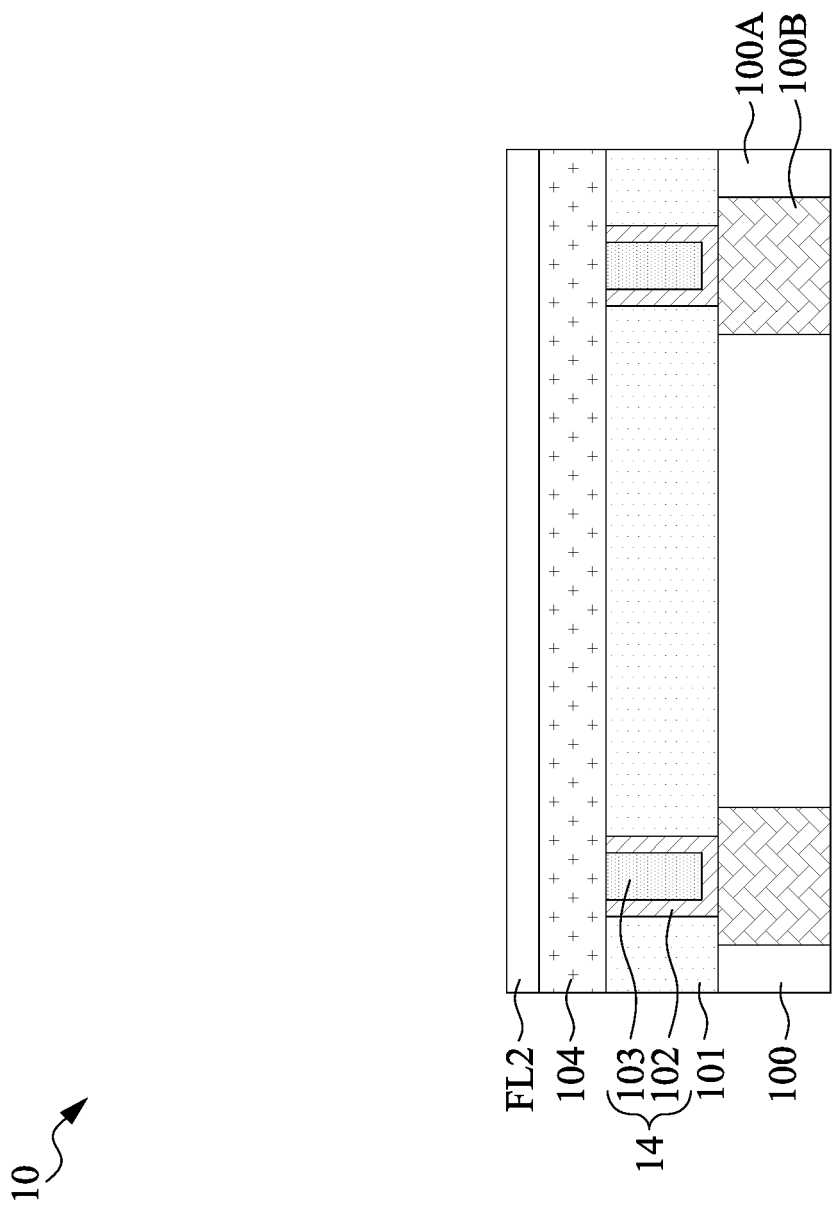

Referring to block 1010B of FIG. 15A and FIG. 20B, a SOT ferromagnetic free layer FL2 is formed on the SOT bottom electrode 104. The SOT ferromagnetic free layer FL2 can be formed by suitable film formation methods, which include PVD including MBE, PLD, ALD, electron beam (e-beam) epitaxy, CVD, or derivative CVD processes further including low pressure CVD (LPCVD), ultrahigh vacuum CVD (UHVCVD), reduced pressure CVD (RPCVD), electro plating, or any combinations thereof. For example, the SOT ferromagnetic free layer FL2 can be a single layer formed by iron (Fe), cobalt (Co), Fe/Co-based alloy, cobalt-iron-boron (CoFeB), CoFe, FeB or the like in some embodiments. The SOT ferromagnetic free layer FL2 can be a tri-layer structure formed by a spacer layer sandwiched between two ferromagnetic layers in some other embodiments. For example, the SOT ferromagnetic free layer FL2 may be a tri-layer structure formed by CoFeB layers sandwiching a spacer layer including non-magnetic materials (e.g., Tantalum (Ta)). The material and the thickness of the SOT ferromagnetic free layer FL2 are discussed previously with regard to FIGS. 1-3.

Figure 20C:
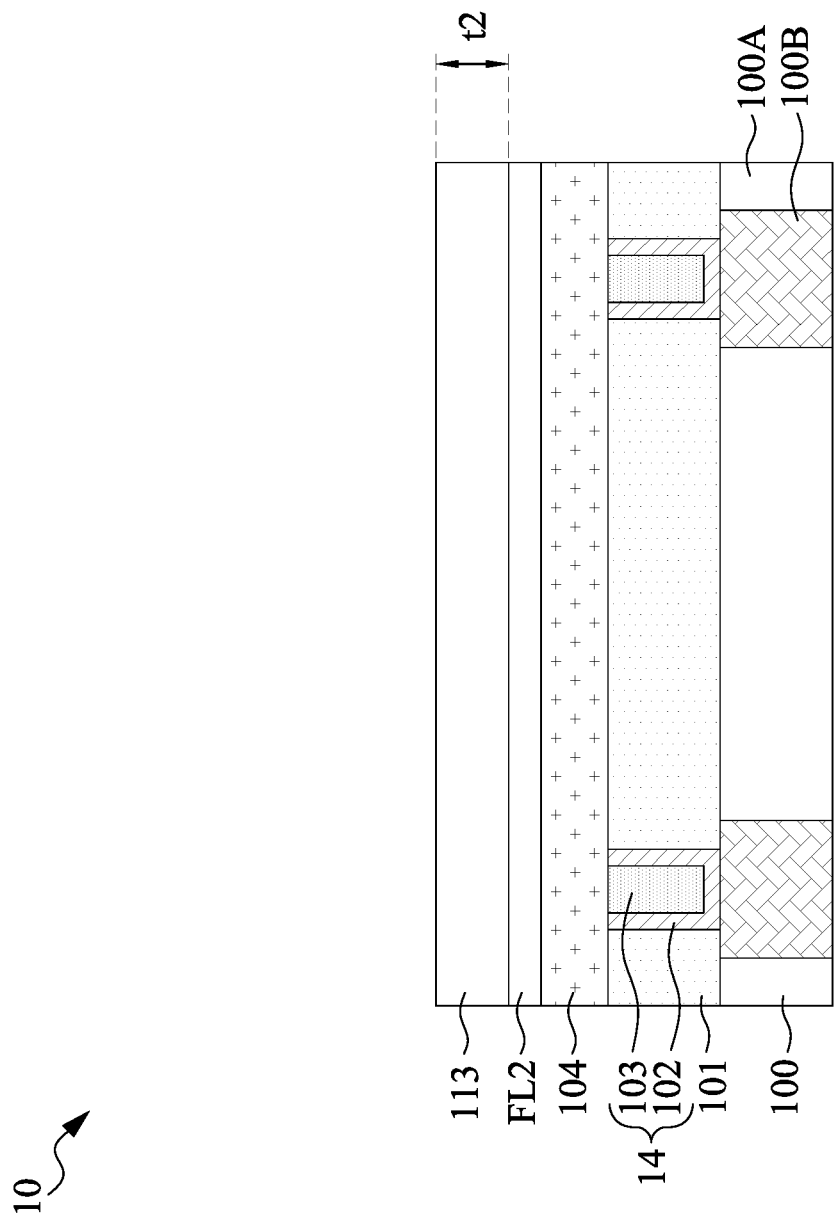

Referring to block 1010C of FIG. 15B and FIG. 20C, a first tunnel barrier layer 113 is formed on the SOT ferromagnetic free layer FL2. The first tunnel barrier layer 113 can be formed by suitable film formation methods, which include PVD including MBE, PLD, ALD, electron beam (e-beam) epitaxy, CVD, or derivative CVD processes further including low pressure CVD (LPCVD), ultrahigh vacuum CVD (UHVCVD), reduced pressure CVD (RPCVD), electro plating, or any combinations thereof. The first tunnel barrier layer 113 can be magnesium oxide (MgO) and has a thickness t2 different from a thickness of a subsequently formed second tunnel barrier layer 115 (see FIG. 20E).

Figure 20D:
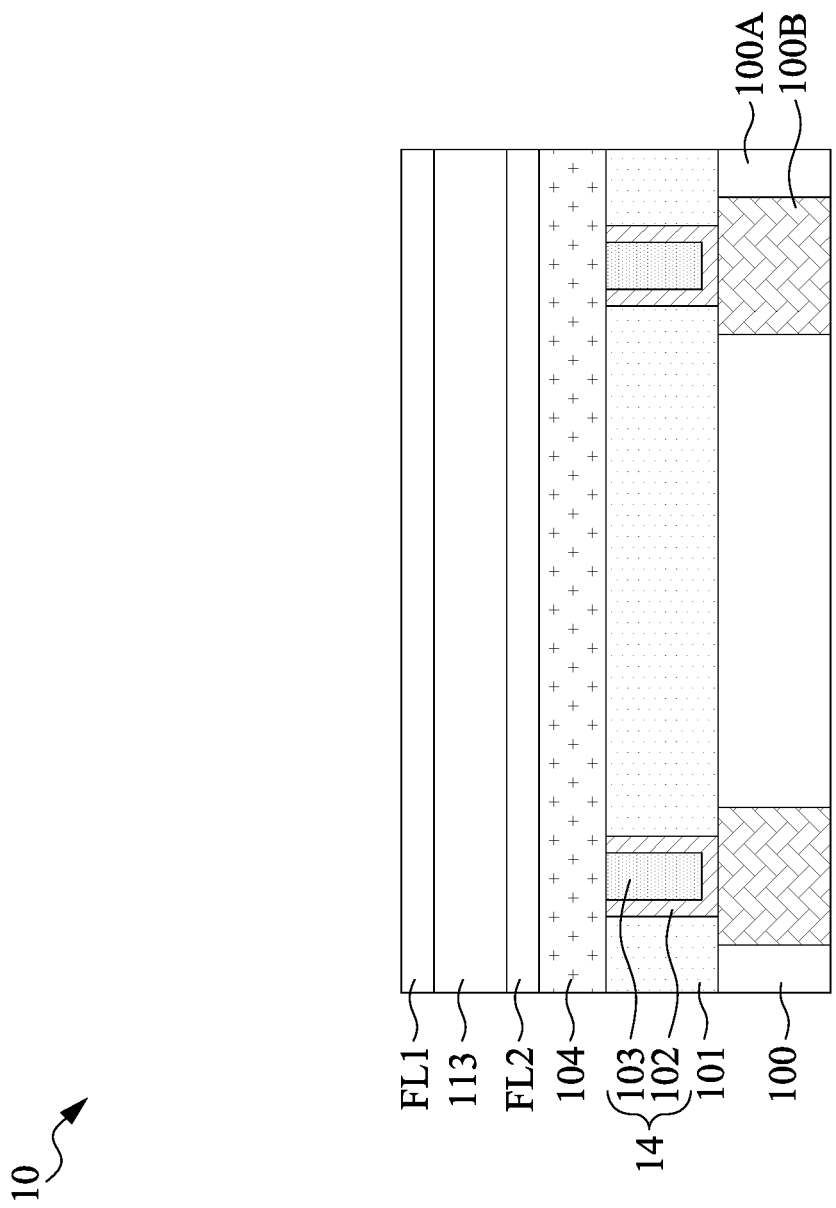

Referring to block 1010D of FIG. 15B and FIG. 20D, an STT ferromagnetic free layer FL1 is formed on the first tunnel barrier layer 113. The STT ferromagnetic free layer FL1 can be formed by suitable film formation methods, which include PVD including MBE, PLD, ALD, electron beam (e-beam) epitaxy, CVD, or derivative CVD processes further including low pressure CVD (LPCVD), ultrahigh vacuum CVD (UHVCVD), reduced pressure CVD (RPCVD), electro plating, or any combinations thereof. For example, the STT ferromagnetic free layer FL1 can be a single layer formed by iron (Fe), cobalt (Co), Fe/Co-based alloy, cobalt-iron-boron (CoFeB), CoFe, FeB or the like in some embodiments. The STT ferromagnetic free layer FL1 can be a tri-layer structure formed by a spacer layer sandwiched between two ferromagnetic layers in some other embodiments. For example, the STT ferromagnetic free layer FL1 may be a tri-layer structure formed by CoFeB layers sandwiching a spacer layer including non-magnetic materials (e.g., Tantalum (Ta)).

Figure 20E:
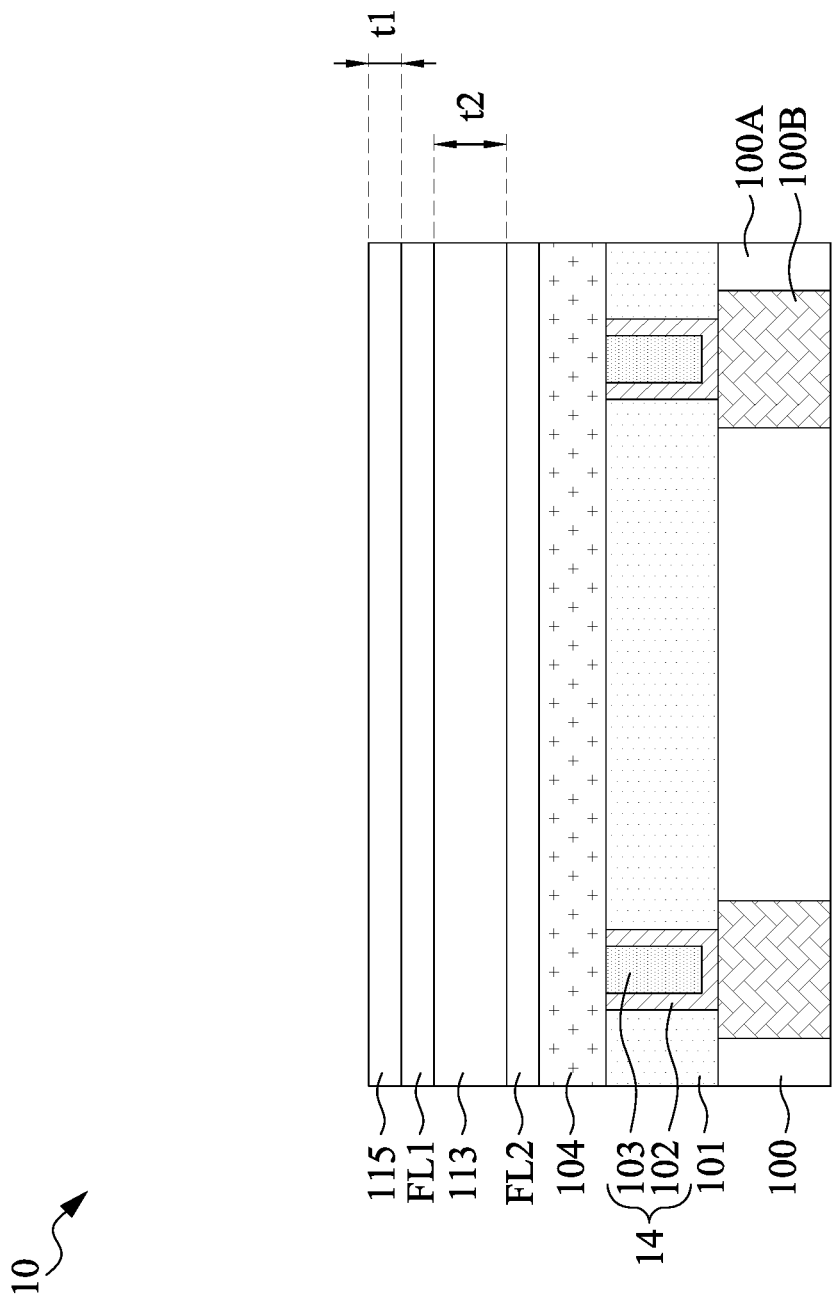

Referring to block 1010E of FIG. 15B and FIG. 20E, a second tunnel barrier layer 115 is formed on the STT ferromagnetic free layer FL1. The second tunnel barrier layer 115 can be formed by suitable film formation methods, which include PVD including MBE, PLD, ALD, electron beam (e-beam) epitaxy, CVD, or derivative CVD processes further including low pressure CVD (LPCVD), ultrahigh vacuum CVD (UHVCVD), reduced pressure CVD (RPCVD), electro plating, or any combinations thereof. In some embodiments, the second tunnel barrier layer 115 can include a material same as the material of the first tunnel barrier layer 113, for example, magnesium oxide (MgO). The second tunnel barrier layer 115 has a thickness t1 different from the thickness t2 of the first tunnel barrier layer 113. For example, the thickness t1 is less than the thickness t2. As mentioned above, by controlling the thickness t2 of the first tunnel barrier layer 113 and the thickness t1 of the second tunnel barrier layer 115 being different from each other, the resistances of different MTJ stacks can be tuned. Details of the values of the thickness t1 and the thickness t2 corresponding to the resistance are discussed previously with regard to FIGS. 4A-4B.

Figure 20F:
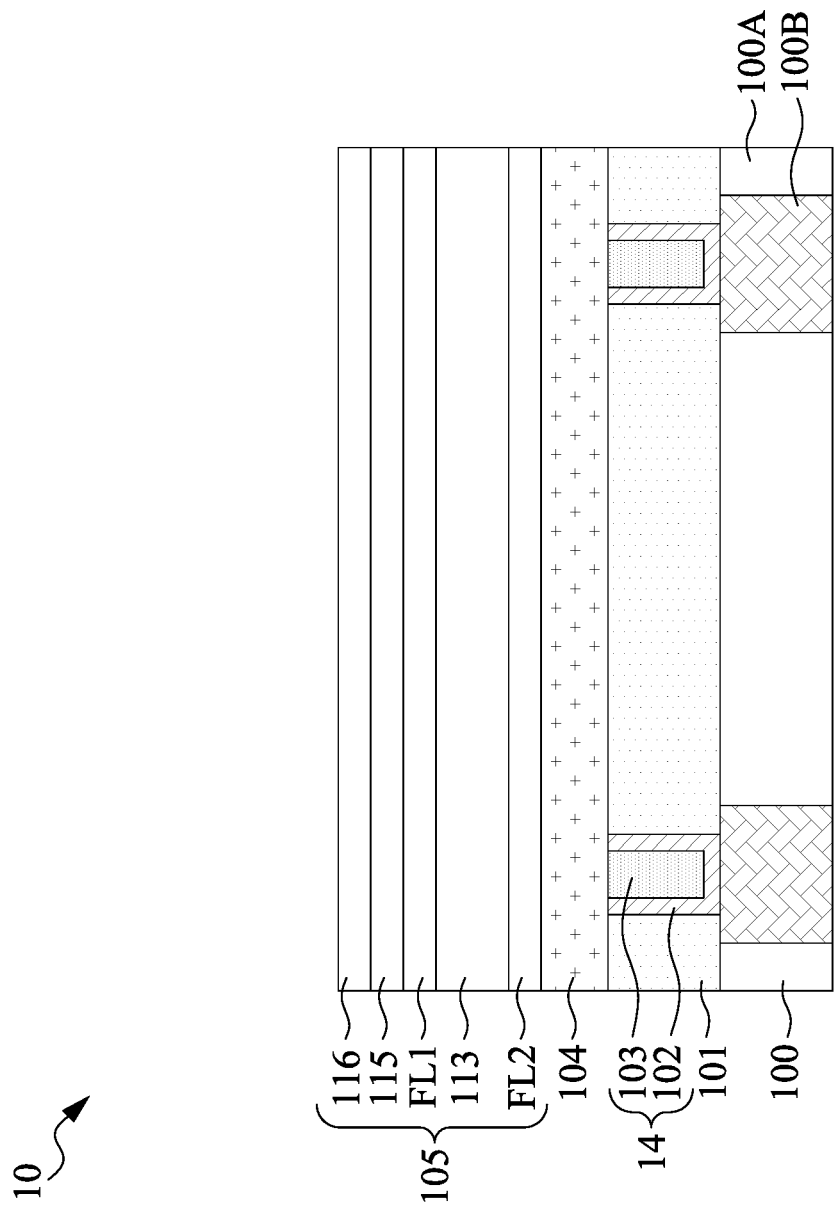

Referring to block 1010F of FIG. 15B and FIG. 20F, a reference layer 116 is formed on the second tunnel barrier layer 115. The reference layer 116 can be formed by suitable film formation methods, which include PVD including MBE, PLD, ALD, electron beam (e-beam) epitaxy, CVD, or derivative CVD processes further including low pressure CVD (LPCVD), ultrahigh vacuum CVD (UHVCVD), reduced pressure CVD (RPCVD), electro plating, or any combinations thereof. In some embodiments, the reference layer 116 includes a suitable ferromagnetic material such as CoFeB, CoFe, FeB, Fe, the like, or a combination thereof and has a thickness in a range from 0.1 nm to 100 nm. The SOT ferromagnetic free layer FL2, the first tunnel barrier layer 113, the STT ferromagnetic free layer FL1, the second tunnel barrier layer 115 and the reference layer 116 in combination are referred to as the memory stack 105.

Figure 20G:
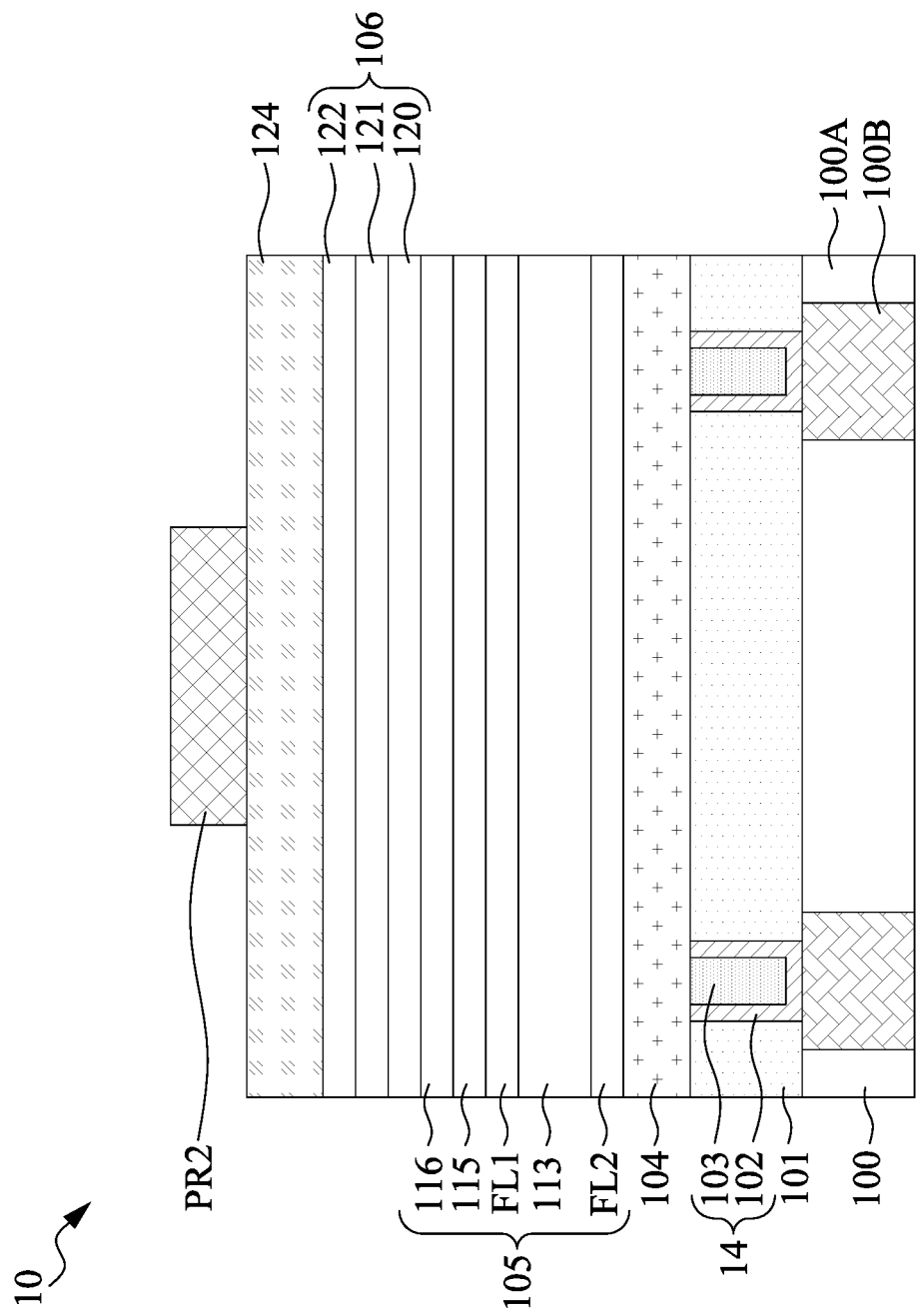

Referring to block 1010G of FIG. 15B and FIG. 20G, a synthetic anti-ferromagnetic (SAF) layer 106, a hard mask 124 and a patterned mask PR2 is formed on the reference layer 116. The SAF layer 106 can be formed by suitable film formation methods, which include PVD including MBE, PLD, ALD, electron beam (e-beam) epitaxy, CVD, or derivative CVD processes further including low pressure CVD (LPCVD), ultrahigh vacuum CVD (UHVCVD), reduced pressure CVD (RPCVD), electro plating, or any combinations thereof. The SAF layer 106 may be a tri-layer structure formed by $[Co/Pt]_N$ multilayer 120, a synthetic anti-ferromagnetic (SAF) spacer 121 and $[Co/Pt]_N$ multilayer 122. In some embodiments, the $[Co/Pt]_N$ multilayer 120 and the $[Co/Pt]_N$ multilayer 120 each has a thickness in a range from 0.1 nm to 50 nm. The cycle number (N) of the two [Co/Pt] N multilayers 120, 122 may be 1 to 10. In some embodiments, the SAF spacer 121 has a thickness in a range from 0.1 nm to 10 nm, for example, 0.1 nm to 5 nm. The SAF spacer 121 may include Ru, Ir or the like. The patterned mask PR2 is, for example, a resist layer formed over the hard mask 124 and then patterned into the patterned mask PR2 using a suitable photolithography process such that portions of the hard mask 124 are exposed by the patterned mask PR2. In some embodiments, the patterned mask PR2 is a photoresist. An exemplary photolithography process may include photoresist coating (e.g., spin-on coating), soft baking, mask aligning, exposure, post-exposure baking, developing the photoresist, rinsing, drying (e.g., hard baking), other suitable processes, or combinations thereof.

The memory stack 105 may have a thickness in a range from 0.1 nm to 100 nm. The SAF layer 106 may have a thickness in a range from 1 nm to 1 μm. The SOT bottom electrode may have a thickness in a range from 0.1 nm to 100 nm. Other details of the memory stack 105 and the SAF layer 106 are discussed previously with regard to FIGS. 1-3.

Figure 21:
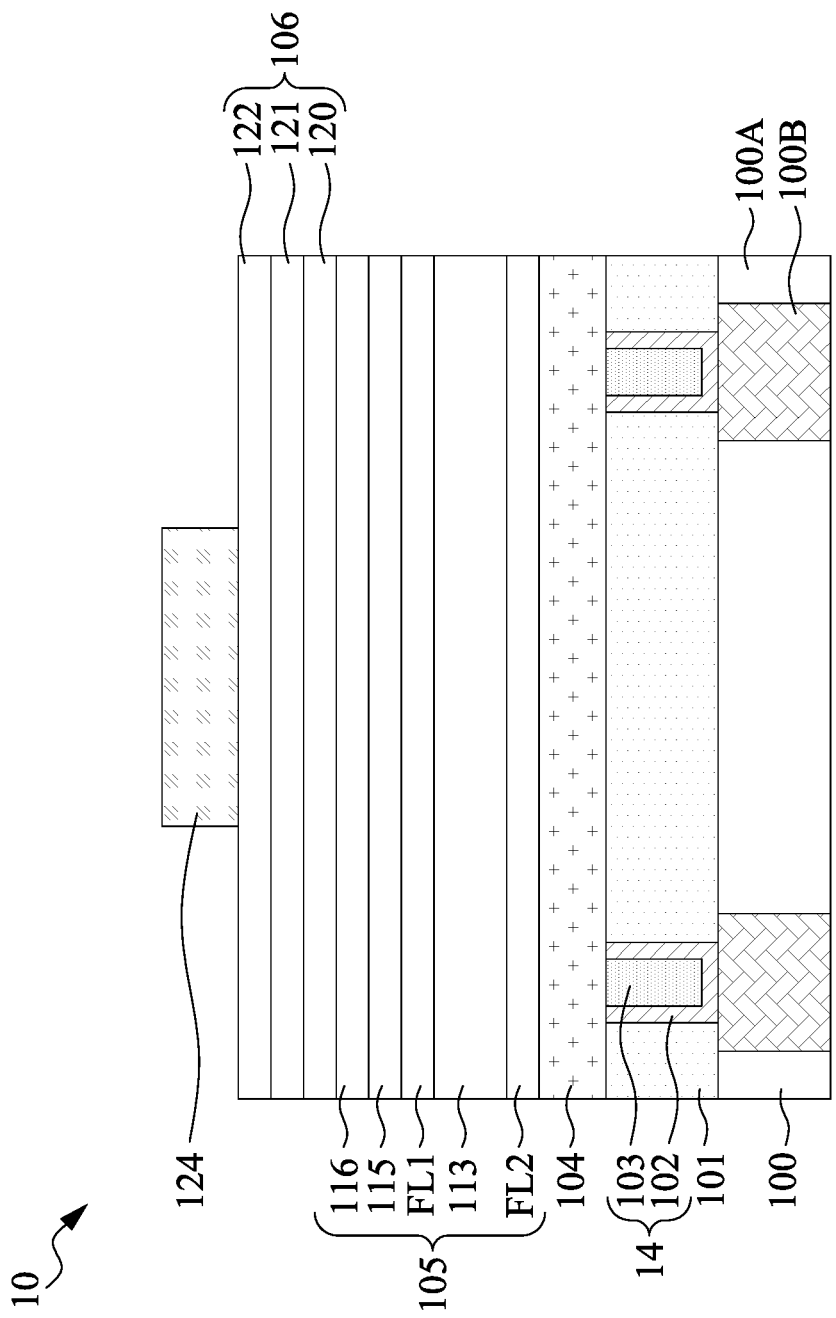

Referring to block 1012 of FIG. 15B and FIG. 21, the hard mask 124 is etched using the patterned mask PR2 as an etch mask. The patterned mask PR2 is then removed using suitable processes such as ashing and/or etching. In some embodiments, the hard mask 124 uses metal materials to further protect the MTJ pillar (e.g. memory stack 105) from etching. In this case, the hard mask 124 also serves as the top electrode of the MTJ pillar (e.g. memory stack 105). No removal is required. The hard mask 124 may have a thickness in a range from 1 nm to 1 μm. The material includes a suitable metal material such as Titanium nitride (TiN), Ru, Ta, the like, or a combination thereof.

Figure 22:
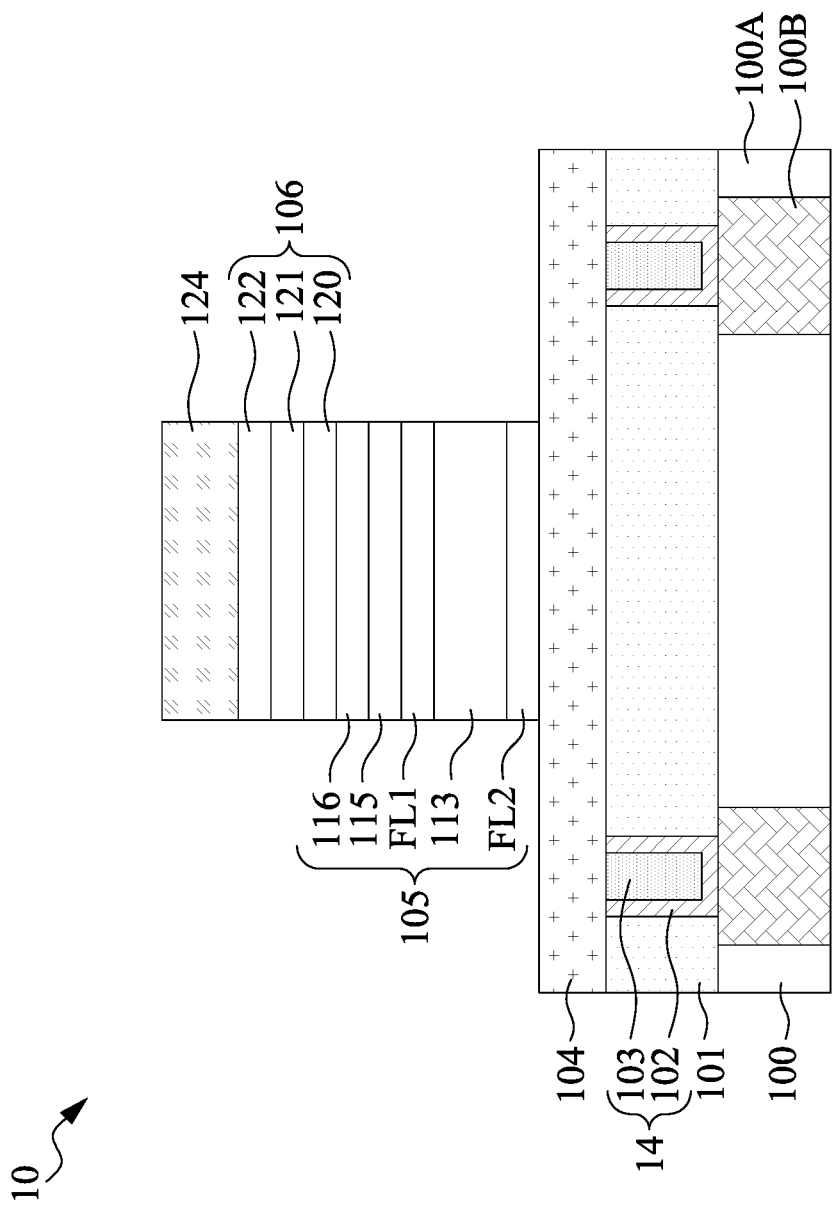

Referring to block 1014 of FIG. 15C and FIG. 22, the SAF layer 106 and the underlying memory stack 105 are etched using the hard mask 124 as an etch mask.

Figure 23:
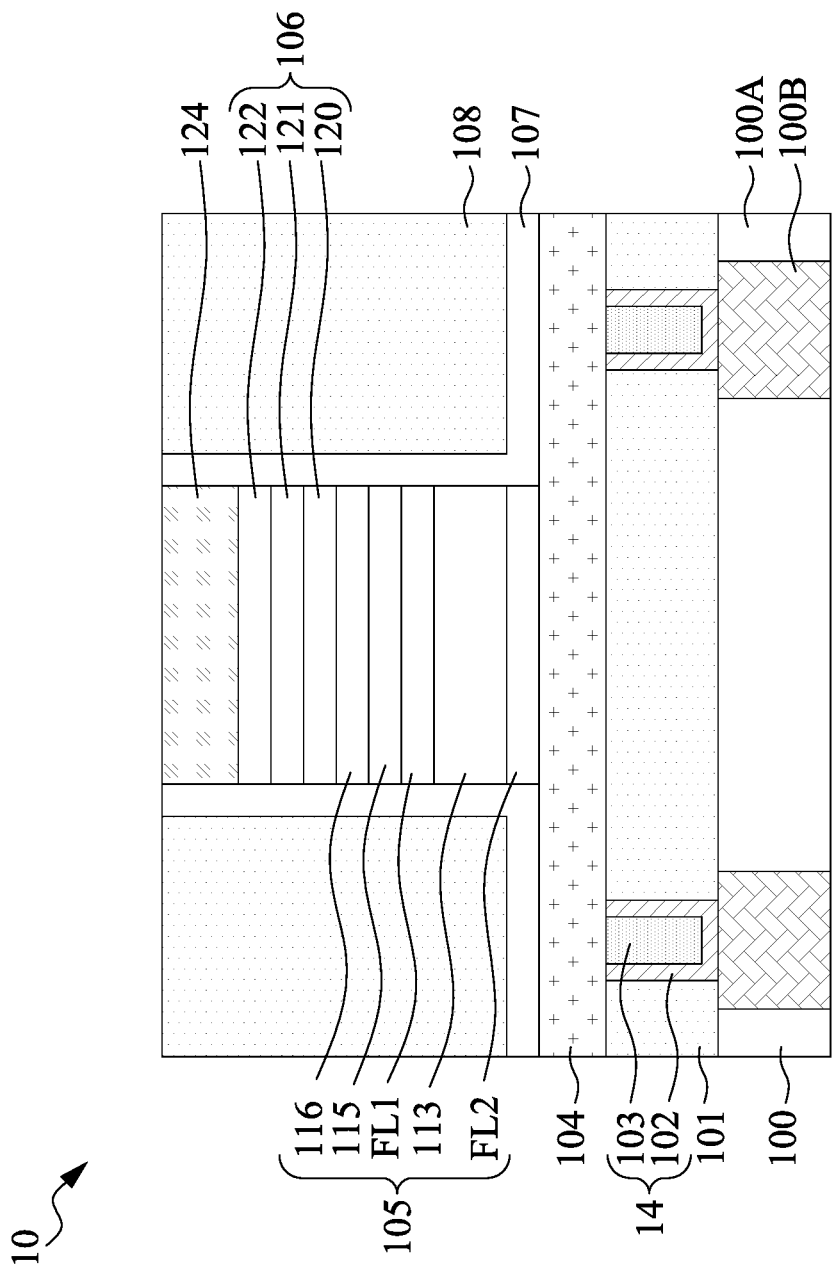

Referring to block 1016 of FIG. 15C and FIG. 23, an encapsulation layer 107 encapsulates the SOT bottom electrode 104, the memory stack 105, the SAF layer 106 and the hard mask 124, and a first inter-layer dielectric (ILD) layer 108 is deposited on the encapsulation layer 107. In some embodiments, the encapsulation layer 107 includes SiN, the like, or combinations thereof. The encapsulation layer 107 may be formed using CVD, ALD, or PVD the like, and/or combinations thereof. A first ILD layer 108 is formed over the encapsulation layer 107. In some embodiments, the first ILD layer 108 may have the same material as the dielectric layer 101. In some other embodiments, the first ILD layer 108 may have a different material than the dielectric layer 101. In some embodiments, the first ILD layer 108 includes silicon oxide, fluorinated silica glass (FSG), carbon doped silicon oxide, tetra-ethyl-ortho-silicate (TEOS) formed oxide, phosphosilicate glass (PSG), borophosphosilicate glass (BPSG), Black Diamond® (Applied Materials of Santa Clara, Calif.), amorphous fluorinated carbon, low-k dielectric material, the like or combinations thereof. A planarization process, such as a CMP process, is performed to remove excess materials of the first ILD layer 108 and the encapsulation layer 107 to expose the SAF layer 106.

Figure 24:
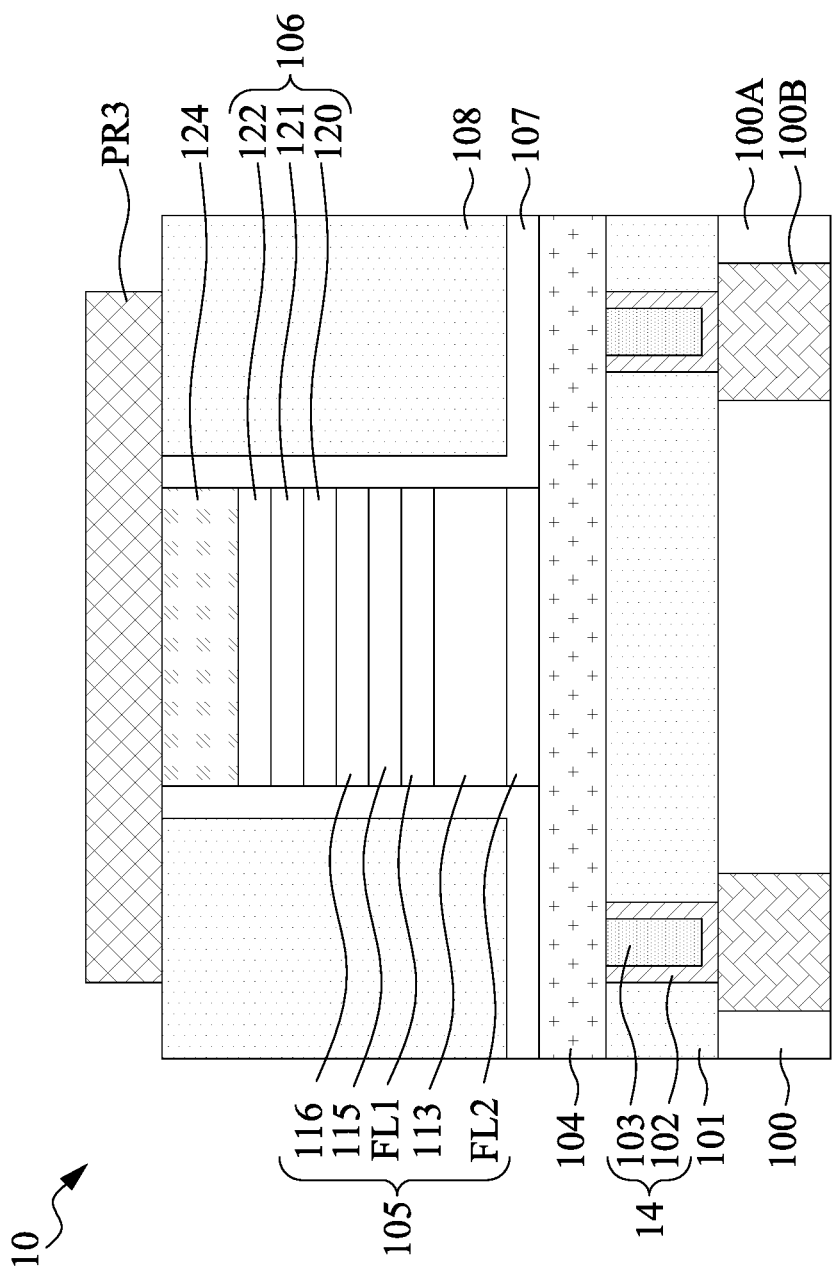

Referring to block 1018 of FIG. 15C and FIG. 24, a patterned mask PR3 is formed on the hard mask 124 and the first ILD layer 108. For example, a resist layer is formed over the SAF layer and the first ILD layer 108 and then patterned into the patterned mask PR3 using a suitable photolithography process such that portions of the first ILD layer 108 is exposed by the patterned mask PR3. In some embodiments, the patterned mask PR3 is a photoresist. An exemplary photolithography process may include photoresist coating (e.g., spin-on coating), soft baking, mask aligning, exposure, post-exposure baking, developing the photoresist, rinsing, drying (e.g., hard baking), other suitable processes, or combinations thereof.

Figure 25:
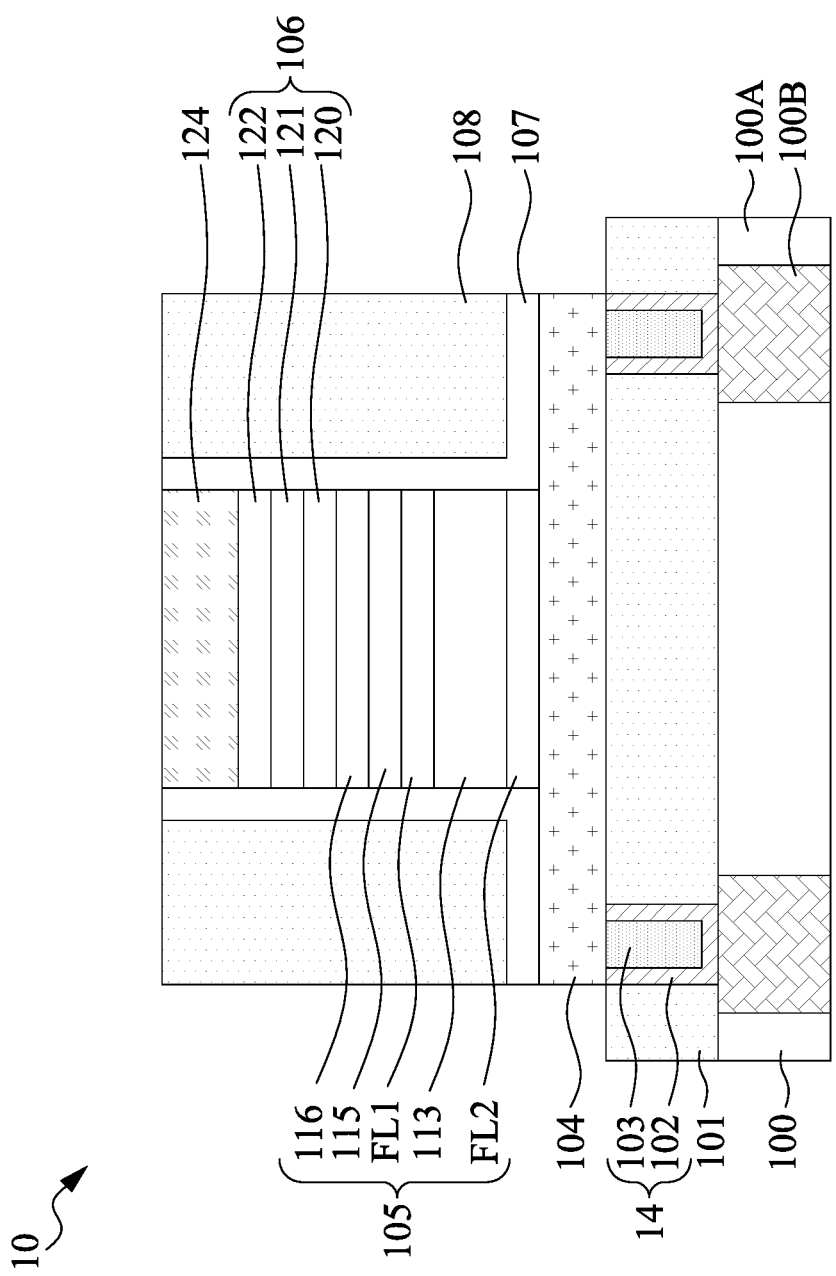

Referring to block 1020 of FIG. 15C and FIG. 25, the first ILD layer 108, the encapsulation layer 107 and the SOT bottom electrode 104 are etched. The dielectric layer 101 is exposed. The patterned mask PR3 is then removed using suitable processes such as ashing and/or etching.

Figure 26:
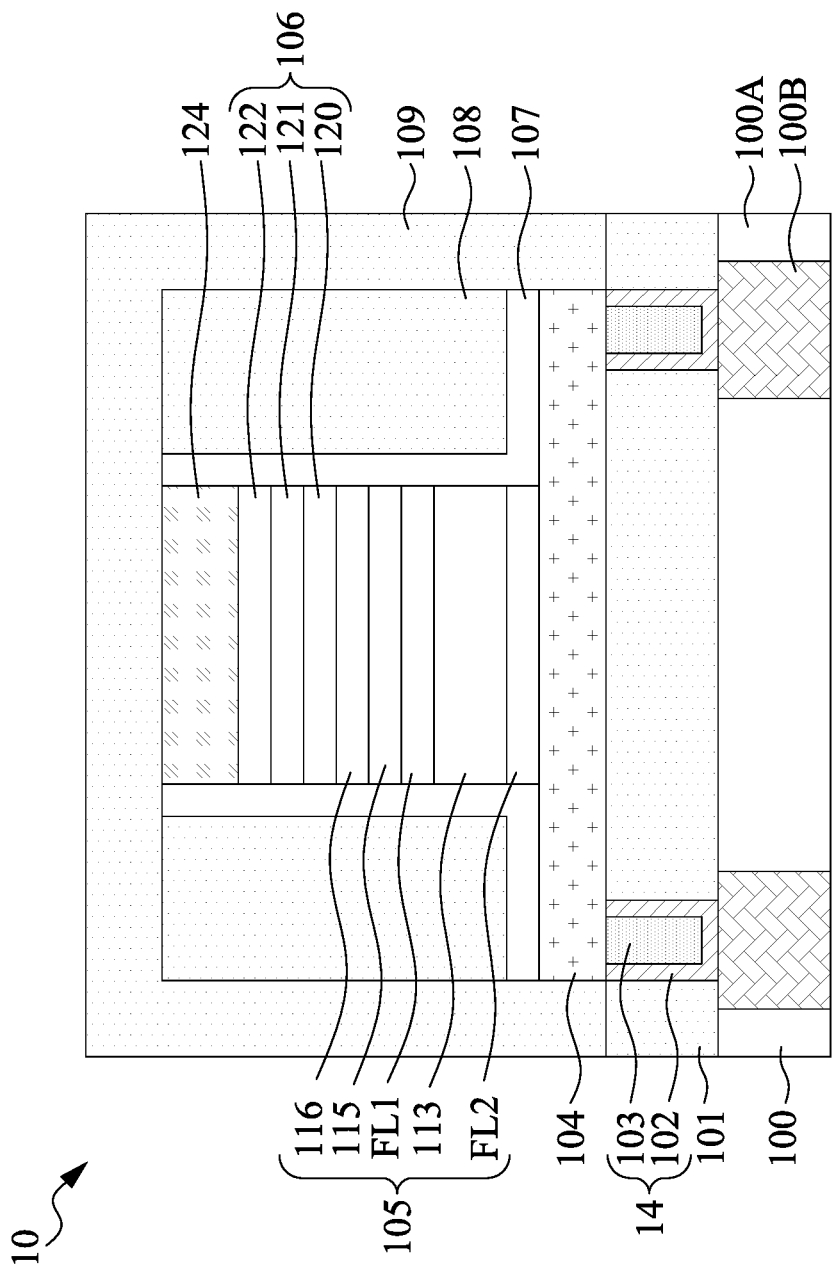

Referring to block 1022 of FIG. 15C and FIG. 26, a second ILD layer 109 is deposited on the first ILD layer 108. The second ILD layer 109 is in contact with the dielectric layer 101. A planarization process, such as a CMP process, is performed to remove excess materials of the second ILD layer 109. The second ILD layer 109 has a thickness in a range from 1 nm to 1 μm. In some embodiments, the second ILD layer 109 includes silicon oxide, fluorinated silica glass (FSG), carbon doped silicon oxide, tetra-ethyl-ortho-silicate (TEOS) formed oxide, phosphosilicate glass (PSG), borophosphosilicate glass (BPSG), Black Diamond® (Applied Materials of Santa Clara, Calif.), amorphous fluorinated carbon, low-k dielectric material, the like or combinations thereof.

Figure 27:
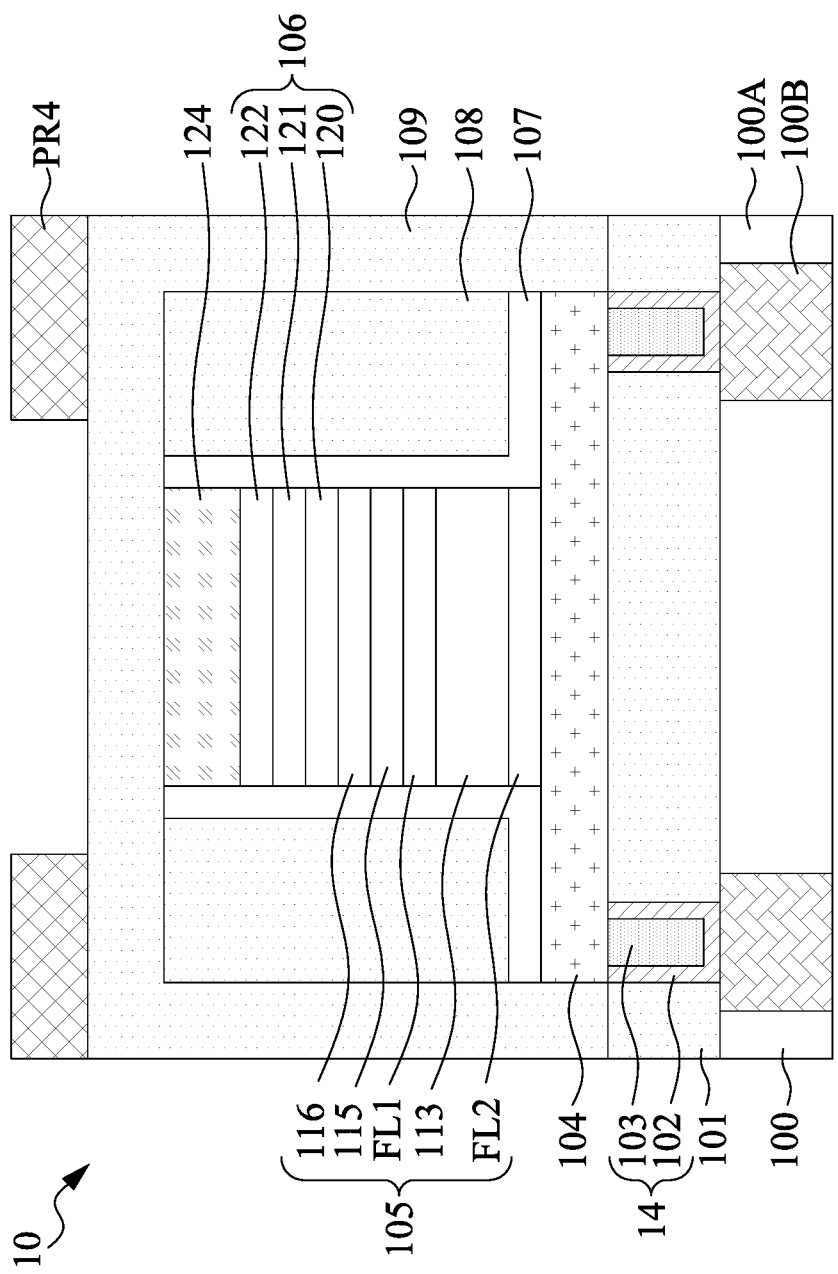

Referring to block of 1024 of FIG. 15C and FIG. 27, a patterned mask PR4 is formed over the second ILD layer 109. For example, a resist layer is formed over the second ILD layer 109 and then patterned into the patterned mask PR4 using a suitable photolithography process such that portions of the second ILD layer 109 are exposed by the patterned mask PR4. In some embodiments, the patterned mask PR4 is a photoresist. An exemplary photolithography process may include photoresist coating (e.g., spin-on coating), soft baking, mask aligning, exposure, post-exposure baking, developing the photoresist, rinsing, drying (e.g., hard baking), other suitable processes, or combinations thereof.

Figure 28:
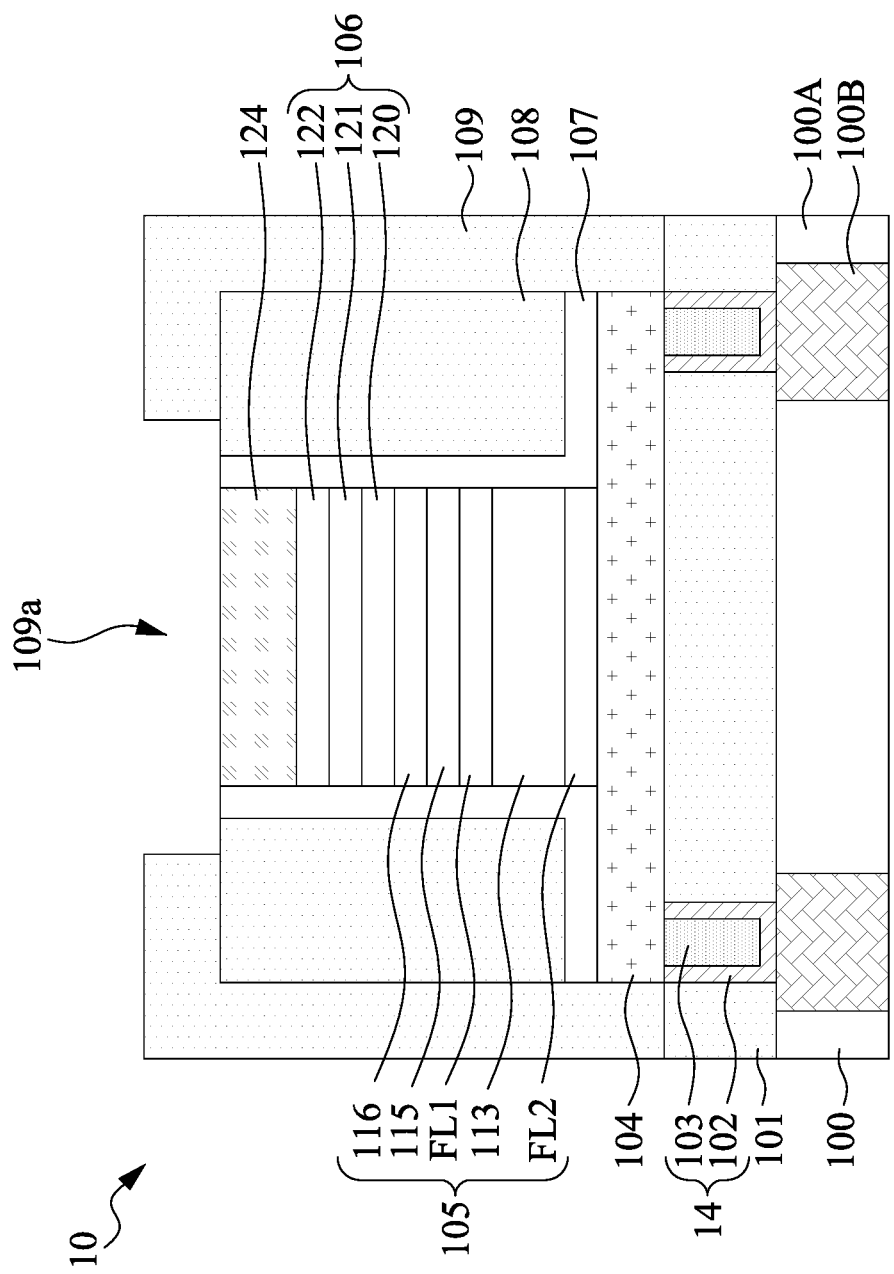

Referring to block 1026 of FIG. 15C and FIG. 28, the second ILD layer 109 is patterned to form a via 109a therein. The patterned mask PR4 is then removed using suitable processes such as ashing and/or etching thereafter. Tops of the hard mask 104, the encapsulation layer 107 and the first ILD layer 108 are exposed through the via 109a.

Figure 29:
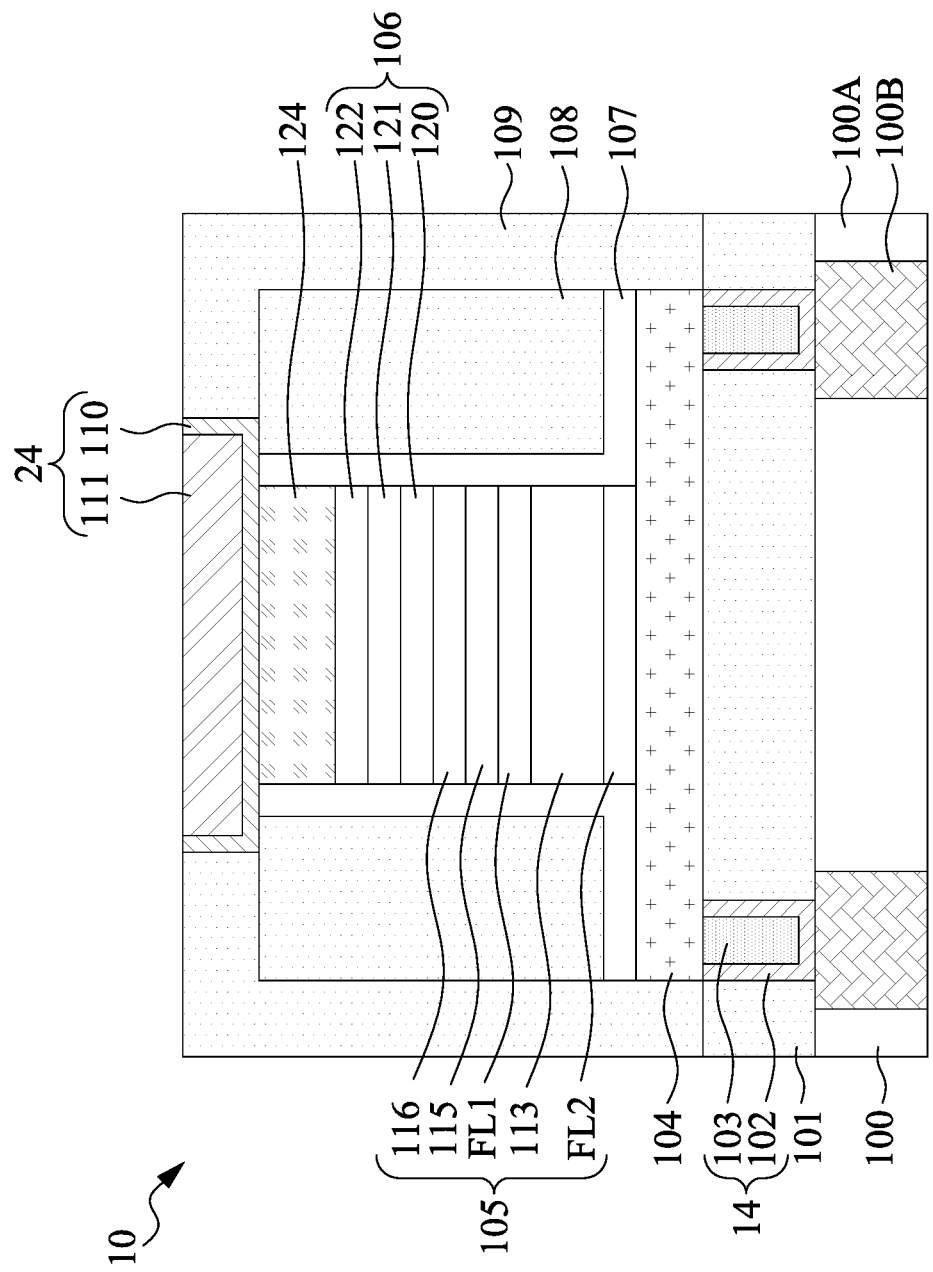

Referring to block 1028 of FIG. 15C and FIG. 29, a conductive via 24 is formed in the via 109a and over the hard mask 124. An exemplary formation method of the conductive via 24 includes forming a diffusion barrier layer 110 lining the via 109a and then filling a filling metal 111 in a recess in the diffusion barrier layer 110, and performing a planarization process, such as a CMP process, to remove excess materials of the diffusion barrier layer 110 and the filling metal 111 outside the via 109a in the second ILD layer 109. The remaining filling metal 111 and the diffusion barrier layer 110 in the via 109a in the second ILD layer 109 in combination can serve as the conductive via 24. The conductive via 24 is electrically connected to the underlying hard mask 124. In some embodiments, the filling metal 111 is copper (Cu) or the like. Formation of the filling metal 111 and the diffusion barrier layer 110 may be exemplarily performed using CVD, PVD, ALD, the like, and/or a combination thereof. In some embodiments, the diffusion barrier layer 110 is a multilayer formed by a Ta layer and a TaN layer over the Ta layer, which can act as a suitable barrier to prevent metal diffusion. The CMP process may selectively stop at the second ILD layer 109. In some embodiments, the filling metal 111 has a thickness in a range from 10 nm to 1 μm. In some embodiments, the diffusion barrier layer 110 has a thickness in a range from 10 nm to 1 μm.

Based on the above discussion, it can be seen that the present disclosure offers advantages. It is understood, however, that other embodiments may offer additional advantages, and not all advantages are necessarily disclosed herein, and that no particular advantages is required for all embodiments. One advantage is that a hybrid MRAM cell written using both STT effect and spin Hall effect (SHE) or Rashba effects can be achieved. Another advantage is that the SOT-STT hybrid MRAM cell can have quaternary data states by using thickness difference between the SOT tunnel barrier and the STT tunnel barrier. Another advantage is that the SOT MTJ stack and the STT MTJ stack can be patterned in a single lithography and etching process using a same photomask, thereby simplifying fabrication of the SOT-STT hybrid MRAM cell.

In some embodiments, a memory device includes a spin-orbit-transfer (SOT) bottom electrode, an SOT ferromagnetic free layer, a first tunnel barrier layer, a spin-transfer-torque (STT) ferromagnetic free layer, a spin-transfer-torque (STT) ferromagnetic free layer, a second tunnel barrier layer and a reference layer. The SOT ferromagnetic free layer is over the SOT bottom electrode. The SOT ferromagnetic free layer has a magnetic orientation switchable by the SOT bottom electrode using a spin Hall effect (SHE) or Rashba effect. The first tunnel barrier layer is over the SOT ferromagnetic free layer. The spin-transfer-torque (STT) ferromagnetic free layer is over the first tunnel barrier layer. The STT ferromagnetic free layer has a magnetic orientation switchable using an STT effect. The second tunnel barrier layer is over the STT ferromagnetic free layer. The second tunnel barrier layer has a thickness different from a thickness of the first tunnel barrier layer. The reference layer is over the second tunnel barrier layer and has a fixed magnetic orientation. In some embodiments, the memory device further includes a synthetic anti-ferromagnetic (SAF) layer over the reference layer. In some embodiments, the thickness of the first tunnel barrier layer is greater than the thickness of the second tunnel barrier layer. In some embodiments, the SOT ferromagnetic free layer has a same lateral dimension as the STT ferromagnetic free layer, and the lateral dimension is measured in a direction parallel with a major surface of the SOT bottom electrode. In some embodiments, the SOT ferromagnetic free layer has a sidewall aligned with a sidewall of the STT ferromagnetic free layer. In some embodiments, the first tunnel barrier layer has a same lateral dimension as the second tunnel barrier layer, and the lateral dimension is measured in a direction parallel with a major surface of the SOT bottom electrode. In some embodiments, the first tunnel barrier layer has a sidewall aligned with a sidewall of the second tunnel barrier layer. In some embodiments, the SOT ferromagnetic free layer, the first tunnel barrier layer and the STT ferromagnetic free layer collectively form a first magnetic tunnel junction. In some embodiments, the STT ferromagnetic free layer, the second tunnel barrier layer and the reference layer collectively form a second magnetic tunnel junction. In some embodiments, the first magnetic tunnel junction has a first high resistance state and a first low resistance state, the second magnetic tunnel junction has a second high resistance state and a second low resistance state, and wherein the first high resistance state of the first magnetic tunnel junction has a different resistance value than the second high resistance state of the second magnetic tunnel junction. In some embodiments, the first low resistance state of the first magnetic tunnel junction has a different resistance value than the second low resistance state of the second magnetic tunnel junction.

In some embodiments, a memory device includes a bottom electrode, a spin-orbit-transfer (SOT) magnetic tunnel junction (MTJ) and a spin-transfer-torque (STT) MTJ. The SOT MTJ includes a first free layer over the bottom electrode, a first tunnel barrier layer over the first free layer, and a second free layer over the first tunnel barrier layer. Each of the first and second free layers has a switchable magnetic orientation. The STT MTJ is over the SOT MTJ. The STT MTJ includes the second free layer, a second tunnel barrier layer over the second free layer, and a reference layer. The reference layer has a pinned magnetic orientation. In some embodiments, the memory device further includes two bottom electrode vias below the bottom electrode. In some embodiments, the memory device further includes a first access transistor having a first source/drain terminal electrically coupled to the reference layer of the STT MTJ, a second access transistor having a first source/drain terminal electrically coupled to a first terminal of the bottom electrode, a bit line electrically coupled to a second terminal of the bottom electrode, and a source line electrically coupled to a second source/drain terminal of the first access transistor and a second source/drain terminal of the second access transistor. In some embodiments, the memory device further includes a first access transistor having a first source/drain terminal electrically coupled to a first terminal of the bottom electrode, a second access transistor having a first source/drain terminal electrically coupled to a second terminal of the bottom electrode, a first bit line electrically coupled to a second source/drain region of the first access transistor, a source line electrically coupled to a second source/drain region of the second access transistor, and a second bit line coupled to the reference layer of the STT MTJ. In some embodiments, the first tunnel barrier layer has a thickness different from a thickness of the second tunnel barrier layer. In some embodiments, the first tunnel barrier layer has a thickness greater than a thickness of the second tunnel barrier layer. In some embodiments, the first tunnel barrier layer has a thickness less than a thickness of the second tunnel barrier layer.

In some embodiments, a method includes forming bottom electrode vias (BEVAs) in a dielectric layer, depositing a bottom electrode layer on the BEVAs, depositing a first ferromagnetic free layer on the bottom electrode layer, depositing a first tunnel barrier layer on the first ferromagnetic free layer, depositing a second ferromagnetic free layer on the first tunnel barrier layer, depositing a second tunnel barrier layer on the second ferromagnetic free layer, depositing a reference layer on the second tunnel barrier layer, depositing a spacer layer on the reference layer, depositing a buffer layer on the spacer layer, depositing a pinned layer on the buffer layer, forming a first patterned mask over the pinned layer, and performing a first etching process to pattern the pinned layer, the buffer layer, the spacer layer, the reference layer, the second tunnel barrier layer, the second ferromagnetic free layer, the first tunnel barrier layer and the first ferromagnetic free layer to form a pattern by using the first patterned mask as an etch mask. In some embodiments, the method further includes removing the first patterned mask after the first etching process, depositing an encapsulation layer on the pattern, depositing an inter-layer dielectric (ILD) layer on the encapsulation layer, forming a second patterned mask over the reference layer, and performing a second etching process to pattern the bottom electrode layer into a bottom electrode by using the second patterned mask as an etch mask. The bottom electrode covers two of the BEVAs.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    forming bottom electrode vias (BEVAs) in a dielectric layer;
    depositing a bottom electrode layer on the BEVAs;
    depositing a first ferromagnetic free layer on the bottom electrode layer;
    depositing a first tunnel barrier layer on the first ferromagnetic free layer;
    depositing a second ferromagnetic free layer on the first tunnel barrier layer;
    depositing a second tunnel barrier layer on the second ferromagnetic free layer;
    depositing a reference layer on the second tunnel barrier layer;
    depositing a spacer layer on the reference layer;
    depositing a buffer layer on the spacer layer;
    depositing a pinned layer on the buffer layer;
    forming a first patterned mask over the pinned layer; and
    performing a first etching process to pattern the pinned layer, the buffer layer, the spacer layer, the reference layer, the second tunnel barrier layer, the second ferromagnetic free layer, the first tunnel barrier layer and the first ferromagnetic free layer to form a pattern by using the first patterned mask as an etch mask.

2. The method of claim 1, further comprising:
    removing the first patterned mask after the first etching process;
    depositing an encapsulation layer on the pattern;
    depositing an inter-layer dielectric (ILD) layer on the encapsulation layer;
    forming a second patterned mask over the reference layer; and
    performing a second etching process to pattern the bottom electrode layer into a bottom electrode by using the second patterned mask as an etch mask, wherein the bottom electrode covers two of the BEVAs.

3. A method, comprising:
    forming a spin-orbit-transfer (SOT) ferromagnetic free layer over a SOT bottom electrode, the SOT ferromagnetic free layer having a magnetic orientation switchable by the SOT bottom electrode using a spin Hall effect (SHE) or Rashba effect;
    forming a first tunnel barrier layer over the SOT ferromagnetic free layer;
    forming a spin-transfer-torque (STT) ferromagnetic free layer over the first tunnel barrier layer, the STT ferromagnetic free layer having a magnetic orientation switchable using an STT effect;
    forming a second tunnel barrier layer over the STT ferromagnetic free layer, the second tunnel barrier layer having a thickness different from a thickness of the first tunnel barrier layer; and
    forming a reference layer over the second tunnel barrier layer and having a fixed magnetic orientation.

4. The method of claim 3, further comprising a synthetic anti-ferromagnetic (SAF) layer over the reference layer.

5. The method of claim 3, wherein the thickness of the first tunnel barrier layer is greater than the thickness of the second tunnel barrier layer.

6. The method of claim 3, wherein the SOT ferromagnetic free layer has a same lateral dimension as the STT ferromagnetic free layer, and the lateral dimension is measured in a direction parallel with a major surface of the SOT bottom electrode.

7. The method of claim 3, wherein the SOT ferromagnetic free layer has a sidewall aligned with a sidewall of the STT ferromagnetic free layer.

8. The method of claim 3, wherein the first tunnel barrier layer has a same lateral dimension as the second tunnel barrier layer, and the lateral dimension is measured in a direction parallel with a major surface of the SOT bottom electrode.

9. The method of claim 3, wherein the first tunnel barrier layer has a sidewall aligned with a sidewall of the second tunnel barrier layer.

10. The method of claim 3, wherein the SOT ferromagnetic free layer, the first tunnel barrier layer and the STT ferromagnetic free layer collectively form a first magnetic tunnel junction.

11. The method of claim 10, wherein the STT ferromagnetic free layer, the second tunnel barrier layer and the reference layer collectively form a second magnetic tunnel junction.

12. The method of claim 11, wherein the first magnetic tunnel junction has a first high resistance state and a first low resistance state, the second magnetic tunnel junction has a second high resistance state and a second low resistance state, and wherein the first high resistance state of the first magnetic tunnel junction has a different resistance value than the second high resistance state of the second magnetic tunnel junction.

13. The method of claim 12, wherein the first low resistance state of the first magnetic tunnel junction has a different resistance value than the second low resistance state of the second magnetic tunnel junction.

14. A method, comprising:
    forming a spin-orbit-transfer (SOT) magnetic tunnel junction (MTJ) comprising a first free layer over a bottom electrode, a first tunnel barrier layer over the first free layer, and a second free layer over the first tunnel barrier layer, each of the first and second free layers having a switchable magnetic orientation; and
    forming a spin-transfer-torque (STT) MTJ over the SOT MTJ, the STT MTJ comprising the second free layer, a second tunnel barrier layer over the second free layer, and a reference layer, the reference layer having a pinned magnetic orientation, the first tunnel barrier layer having a thickness different from a thickness of the second tunnel barrier layer.

15. The method of claim 14, further comprising:
    two bottom electrode vias below the bottom electrode.

16. The method of claim 14, further comprising:
    a first access transistor having a first source/drain terminal electrically coupled to the reference layer of the STT MTJ;
    a second access transistor having a first source/drain terminal electrically coupled to a first terminal of the bottom electrode;
    a bit line electrically coupled to a second terminal of the bottom electrode; and
    a source line electrically coupled to a second source/drain terminal of the first access transistor and a second source/drain terminal of the second access transistor.

17. The method of claim 14, further comprising:
    a first access transistor having a first source/drain terminal electrically coupled to a first terminal of the bottom electrode;
    a second access transistor having a first source/drain terminal electrically coupled to a second terminal of the bottom electrode;

a first bit line electrically coupled to a second source/drain region of the first access transistor;
a source line electrically coupled to a second source/drain region of the second access transistor; and
a second bit line coupled to the reference layer of the STT MTJ.

18. The method of claim 14, wherein the first tunnel barrier layer has a thickness greater than a thickness of the second tunnel barrier layer.

19. The method of claim 14, wherein the first tunnel barrier layer has a thickness less than a thickness of the second tunnel barrier layer.

20. The method of claim 14, wherein the second tunnel barrier layer is in physical contact with the reference layer.

* * * * *